United States Patent
McGinnis

(10) Patent No.: US 8,657,226 B1
(45) Date of Patent: Feb. 25, 2014

(54) EFFICIENT CONTROL AND STALL PREVENTION IN ADVANCED CONFIGURATION AIRCRAFT

(76) Inventor: John William McGinnis, Kalispell, MT (US)

(*) Notice: Subject to any disclaimer, the term of this patent is extended or adjusted under 35 U.S.C. 154(b) by 835 days.

(21) Appl. No.: 11/623,042

(22) Filed: Jan. 12, 2007

(51) Int. Cl.
*B64C 3/38* (2006.01)

(52) U.S. Cl.
USPC ........................................... 244/45 R

(58) Field of Classification Search
USPC ................. 244/45 R, 225, 90 R, 87, 47, 48
See application file for complete search history.

(56) References Cited

U.S. PATENT DOCUMENTS

| | | | |
|---|---|---|---|
| 1,971,591 A | | 8/1934 | Zaparka |
| 1,971,592 A | | 8/1934 | Zaparka |
| 2,194,596 A | * | 3/1940 | Henter ............................ 244/13 |
| 3,202,383 A | * | 8/1965 | Le Bel et al. ................. 244/209 |
| 3,834,654 A | * | 9/1974 | Miranda .......................... 244/13 |
| 3,981,460 A | * | 9/1976 | Ratony ............................ 244/13 |
| 4,053,125 A | * | 10/1977 | Ratony ............................ 244/46 |
| 4,090,681 A | * | 5/1978 | Zimmer ....................... 244/45 R |
| 4,146,199 A | * | 3/1979 | Wenzel ........................ 244/45 R |
| 4,365,773 A | * | 12/1982 | Wolkovitch ................. 244/45 R |
| D304,821 S | * | 11/1989 | Ratony ......................... D12/331 |
| D308,043 S | * | 5/1990 | Butler .......................... D12/342 |
| D311,720 S | * | 10/1990 | Butler .......................... D12/331 |
| 5,503,352 A | * | 4/1996 | Eger ............................ 244/45 R |
| 5,899,409 A | * | 5/1999 | Frediani ......................... 244/13 |
| 6,098,923 A | * | 8/2000 | Peters, Jr. .................... 244/45 R |
| 6,840,478 B2 | * | 1/2005 | Carr ............................. 244/45 R |
| 2006/0108472 A1 | * | 5/2006 | Clark .............................. 244/87 |
| 2006/0144991 A1 | * | 7/2006 | Frediani ..................... 244/45 R |

OTHER PUBLICATIONS

George C. Greene, Viscous Induced Drag; AIAA A88-42196, 1988.
Paul Seidenman and David Spanovich, Cutting Fuel Costs; Aviation Week & Space Technology, Jul. 25, 2005.

* cited by examiner

*Primary Examiner* — Philip J Bonzell
(74) *Attorney, Agent, or Firm* — Cherskov Flaynik & Gurda, LLC

(57) ABSTRACT

Multiple initiatives are applied to achieve synergistic control enhancement and drag reduction benefits in an aircraft having independent airfoils producing downward force opposite to wing lift in normal flight, which are supported in specific wingtip locations. A method is disclosed teaching the exemplary stall resistance and control at high angles of attack demonstrated by preferred embodiments of the invention.

17 Claims, 15 Drawing Sheets

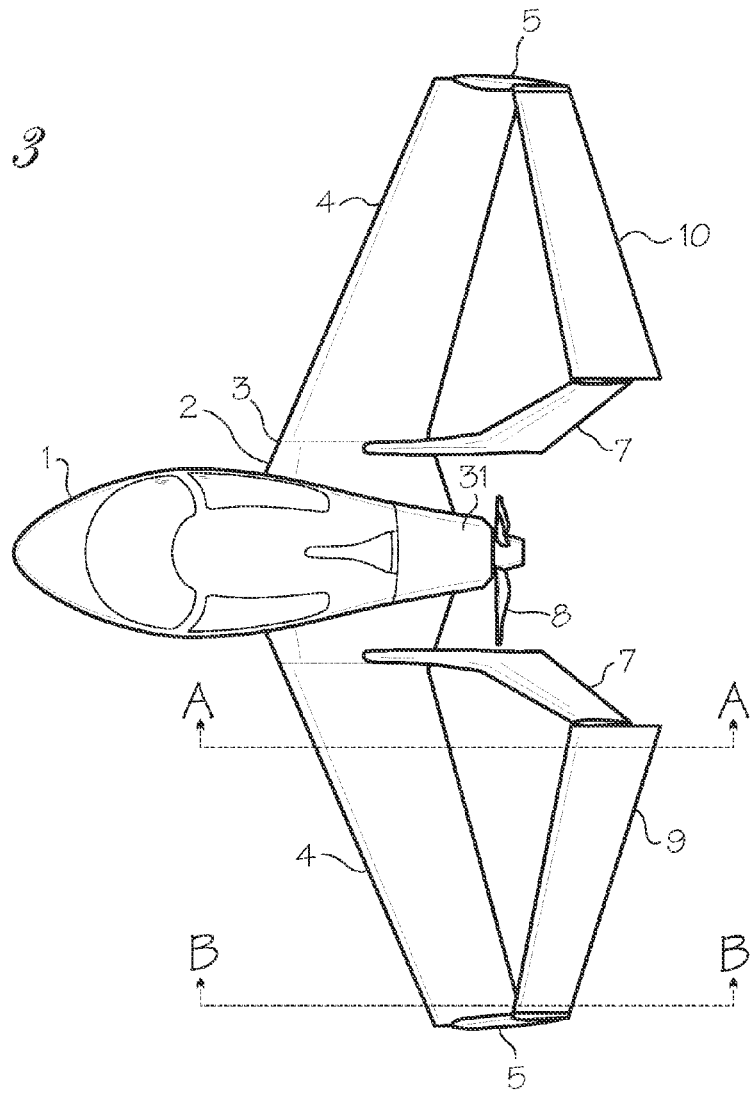
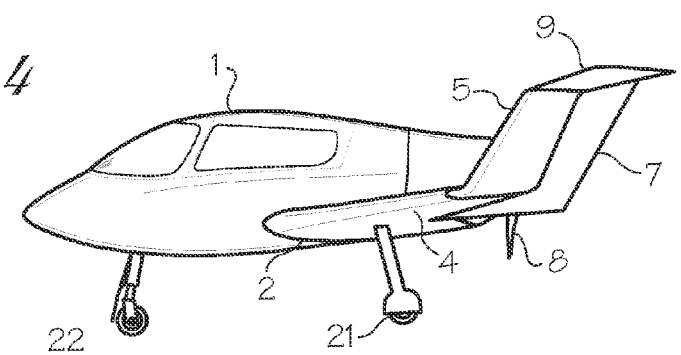

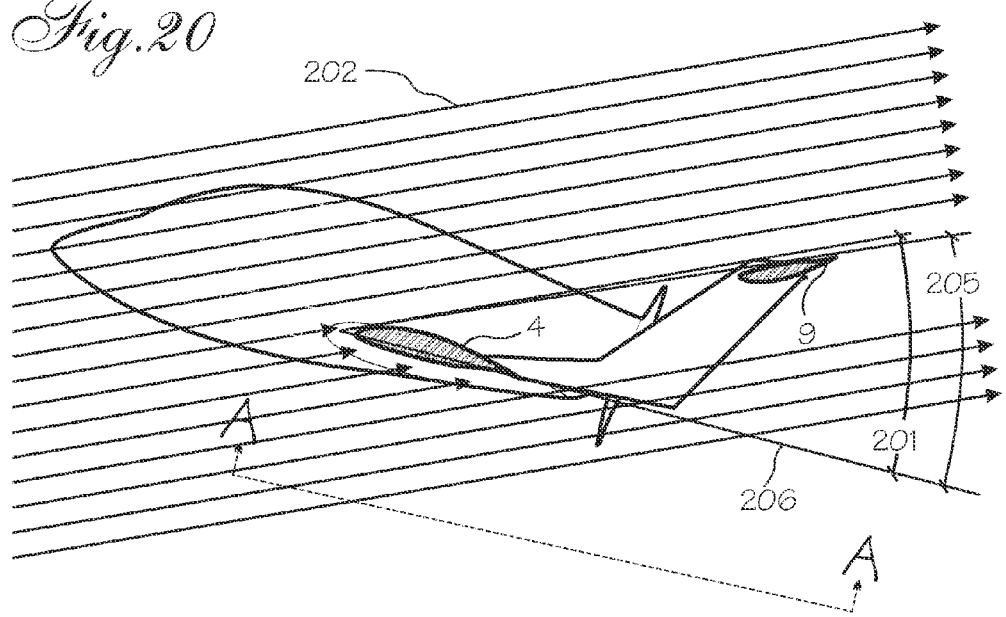
Fig.20
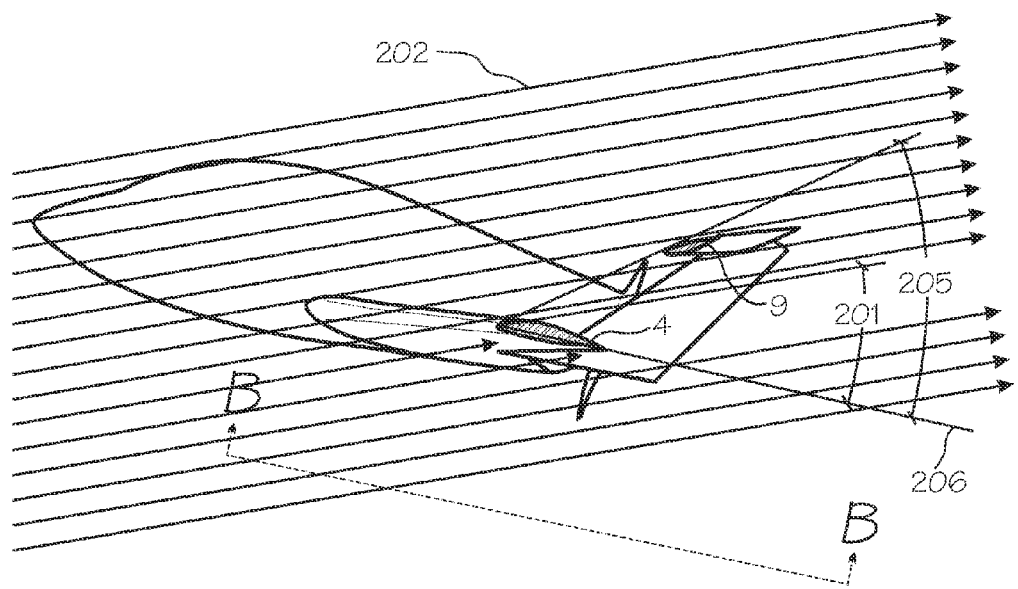

EFFICIENT CONTROL AND STALL PREVENTION IN ADVANCED CONFIGURATION AIRCRAFT

FIELD OF THE INVENTION

This invention relates to the field of aircraft; specifically to powered and unpowered aircraft of all sizes, especially those operable at high levels of aerodynamic efficiency; whether manned or unmanned; controlled or uncontrolled. The invention applies generally to design in fluid dynamic disciplines.

BACKGROUND OF THE INVENTION

Modern aircraft design recognizes conflicting priorities between higher speed and lower speed operations. Aircraft for low speed flight differ markedly from those intended for high speed flight, and one type may rarely be useful for the other. Historically, to obtain higher speed requires higher power, and high powered aircraft use a lot of fuel. Fast aircraft generally require long paved runways. Likewise, to shorten takeoff and landing distances, faster aircraft demand complex design, controls, and operation. Fast, but efficient aircraft- those having a minimum total of induced drag, surface drag (also known as friction drag or parasitic drag), and for supersonic aircraft, wave drag—also cost more because they are sensitive to size, weight, and incorporation of all the mechanisms used to configure the aircraft for low speed operation, such as when landing. This mandates more expensive design and materials. Comprehensive solutions targeting such problems at their most fundamental levels are of great economic value, but until the present, to obtain lower drag in higher speed operation remains an expensive process filled with compromise.

Two goals common to aircraft invention are the improvement of handling, especially at low speeds, and the reduction of drag. However, improved handling is frequently obtained at the cost of additional drag. Thus, aircraft types offering good handling at low speeds tend to have lower top speeds. While reductions in drag allow a reduction in power requirements and fuel consumption, increases in available payload or range, or corresponding reductions in weight, designers have to choose between the types of drag they can reduce, or accept both compromise and high costs. At low speeds, encountered during takeoff and landing and while maneuvering in airport traffic patterns, surface drag reductions offer little benefit. Indeed, highly streamlined aircraft frequently handle poorly at low speeds and are further disadvantaged by the time or distance needed to slow the vehicle down. At higher speeds, surface drag caused by minor variations and imperfections becomes critical. On the other hand, lower induced drag greatly improves climb performance and payload capacity for a given available power, improving range and fuel economy well beyond whatever nominal savings are shown in cruising flight. Lower air density at high altitudes rapidly demonstrates the value of designing for lower induced drag, because true airspeeds increase in thinner air. Lower induced drag improves high altitude flight, leading to benefits in high speed operation. This makes the reduction of induced drag significant for most aircraft, yet, aside from soaring applications, low induced drag is uncommon among low speed aircraft and rare among high speed aircraft. Thus a pressing need is improved low speed handling in an aerodynamically clean aircraft also having low induced drag.

According to both classical aerodynamic theory and experience, increasing wingspan lowers induced drag. However, all aircraft seeking greater payload or economy through higher efficiency quickly reach limits for material strengths and airport infrastructure, which constrain wingspan. Therefore, a goal of many aircraft designers is to obtain the induced drag reduction of greater wingspan by means of technology having similar effect. Unfortunately, many such efforts are not practical. Some prior art lowers induced drag by marginal amounts, yet adds to total drag, weight, and complexity to such a degree that their net overall value is debatable. Simultaneous reduction of induced drag and surface drag demands an entirely new approach.

Consequently, aircraft capable of high speed operation remain high powered. They often require flaps, slats, or other high-drag means of lift augmentation even to operate at low speeds.

High costs of safely achieving such efficiency-promoting goals as laminar flow and pressure seal of the aircraft flight surfaces mean that fuselage drag remains the easiest target for compromise, and in a typical high speed aircraft, cabin volume is minimized. This negatively impacts the passenger experience and lowers utility. At the same time, efficiency losses of the smallest magnitude represent millions of dollars in transportation fuel costs annually. Equivalent performance at lower fuel consumption is a need having extreme economic benefits.

Another goal of aircraft invention is greater safety. Crash prevention, short field and unimproved runway operation are objectives unfulfilled by the majority of prior art, especially among faster aircraft. Historically, stalls and stall/spins are the major cause of aircraft accidents and are typically deadly when they occur in close proximity to the ground or structures. A factor contributing to stall related accidents is the erroneous belief that stall is a function of airspeed; that stalls do not happen above certain "speeds". It does not help that "stall speed" is a term that permeates aviation, even though the correct understanding is widely known. Aircraft that do not stall thus often represent an ideal objective, but a rare reality. Likewise, improvement in air transportation systems require aircraft able to operate safely at both lower and higher speeds than at present, such that safer future aircraft may be defined in part by the smaller size of airports or private airfields needed to handle their operations. Growth in personal air vehicle initiatives is even more dependent upon safe low speed handling characteristics, reduced noise, and improved ease of operation. Fast aircraft that can fly slowly while remaining fundamentally incapable of departure from fully controlled flight thus represent a key to distributed transportation solutions. For commercial aviation, at the other end of the size scale, dangerously powerful vortex created in the wake of very large transport aircraft represents both hazard and inefficiency. Invention that reduces wake vortex for fuel economy also promotes safer interaction of large planes with other aircraft.

Finally, practical roadable and stowable aircraft are needed. New technology in aircraft design should give greater priority to removable and foldable flight surfaces to simplify ground transport and storage. Invention that builds from a base of simplicity, safety and efficiency in these requirements leads the way to practical flying vehicles that may be drivable. Similar mechanical challenge is involved in variable geometry wings. For both cases, simplified control paradigms and light weight are paramount to overcoming the failures of prior art. Extensive study and research into these and the foregoing areas, including flight modeling and scale model testing, has through insight resulted in the exemplary solutions embodied in the present invention.

BRIEF SUMMARY OF THE INVENTION

My invention applies multiple novel and counterintuitive initiatives to achieve outstanding benefits relating to aircraft efficiency and control, which include a method for the prevention of stall. The invention characteristically positions separate and appropriately supported airfoils in the area surrounding the wingtip, vertically spaced away from the generally affected airflow over the wing. Typically acting as enlarged aileron or elevon control surfaces, these airfoils differ from ailerons of prior art not only by their larger separation from the wings, but also in their configuration to produce downward force, opposite to the direction of wing lift, in normal flight. Typical aileron control surfaces (221, 227) found in the wings of conventional aircraft (FIG. 22A) can be eliminated. When the airfoils are positioned behind a center of wing lift that is behind the center of mass, the typical horizontal control surfaces (220, 225), usually found centered on the tail of conventional aircraft (FIG. 22A), can be eliminated. The resulting configuration is extremely effective and allows the control function of elevators (225, FIG. 22) and ailerons to be combined in controllable elevons (9,10), which can provide simultaneous control of two or more rotational axes of the aircraft in preferred forms (FIG. 1). The significant downward aerodynamic force created by these relatively large, typically inverted airfoils (9,10) which are positioned, optimally, above and behind each wingtip area requires structure appropriate to reliably transfer pitch stabilizing forces and strong control forces to the aircraft (FIG. 2) so as to preferably allow wing airfoils to be unbroken by hinge lines. External wingtip elevons (9,10) of a preferred embodiment (FIG. 1) may thereby be rotatably attached at both ends so as to adjustably pivot on their spanwise axis. Upwardly extending elevon support structure (7) may incorporate other functions, such as lateral (yaw) stabilizing functions. However, supporting structure (5) at the wingtips need not be present in every embodiment, as its structural function may not always be necessary (FIG. 16B, FIG. 15). In contrast to prior art, the detailed disclosure of various enabling aspects of the invention, such as position, support, separation, span, orientation, and downward loading of generally horizontal control airfoils (9, 10) above or below the wingtip area teaches enhanced control authority and stability together with the reduction of complexity. Corresponding reductions in surface drag and weight may be achieved while simultaneously creating opportunity for a major reduction of induced drag. The invention enables a lightweight structure that may be more specifically configured to render the aircraft incapable of stall, by applying the disclosed method. The invention teaches many improvements, and they are combined to result in a new class of aircraft having outstanding capabilities and efficiencies. The exclusive invention claimed, though counterintuitive and technically very advanced, is characterized by simplicity heretofore elusive.

Applying the invention to new aircraft types solves many problems impeding aeronautical progress, particularly with respect to fuel efficiency. Application to existing types of aircraft results in a huge variety of novel forms. Certain embodiments of this invention may superficially resemble biplane, boxplane or joined wing designs of prior art, but since the invention requires the upper or secondary flight surfaces to produce downforce in normal flight, provide efficient control of pitch and roll, and, optionally, allow their use in stall prevention, visual resemblance is misleading. In this disclosure, the terms structure, configuration, and structural configuration are used interchangeably in reference to the arrangement disclosed herein.

BRIEF DESCRIPTION OF THE DRAWINGS

FIG. 3 is a view of said aircraft from the top.

FIG. 4 is a view of said aircraft from the side.

FIG. 20 is a section view of the aircraft of FIG. 3 showing the action of the stall prevention method.

Figure 1:
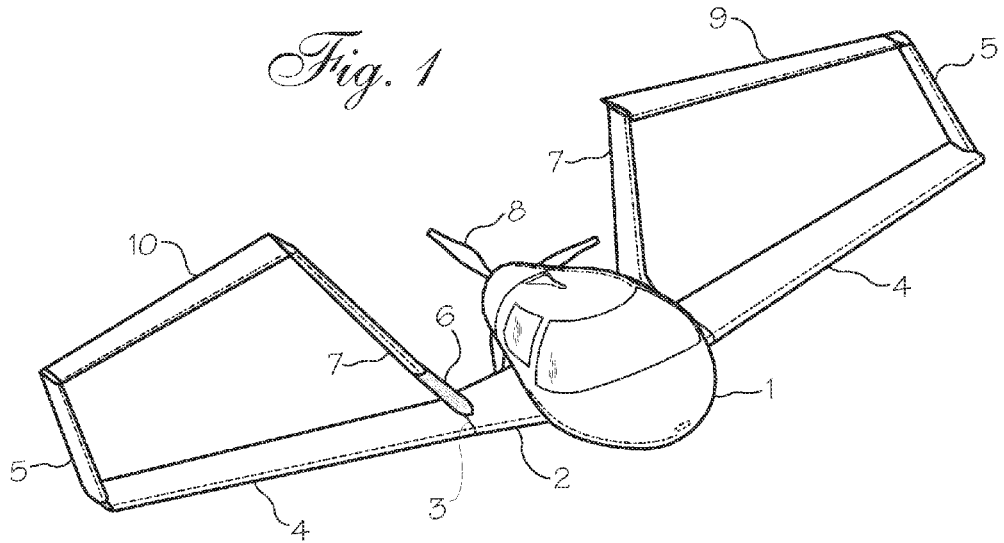
FIG. 1 is a perspective view of a preferred embodiment; a single engine general aviation aircraft of high performance; capable of exceptional low speed handling.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DETAILED DESCRIPTION AND SUMMARY OF ADVANTAGES OF THE INVENTION

The invention disclosed is a fundamental enabling technology that may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner. The present invention applies to innumerable aircraft designs including next (FIG. 5) and future generation (FIG. 13) large transport aircraft, next generation general aviation aircraft (FIG. 1), commuter aircraft (FIG. 16), blended wing body aircraft (FIG. 17), Light Sport Aircraft (FIG. 15), personal air vehicles, remotely piloted vehicles (RPVs), unmanned aerial vehicles (UAVs), model aircraft, toy airplanes, and many others. Since the invention can be readily adapted into products built by a majority of aircraft manufacturers, using a variety of material processes, the technology is not disruptive. Aircraft configurations supporting large, highly separate external airfoils (9,10), preferably ailerons or elevons, so as to produce lift-opposing downforce in bilateral wingtip locations (FIG. 1), by means of support structure able to reliably transfer significant aerodynamic forces to the wing root (2), wing (4), or fuselage (1), whether through vertical stabilizers (7), cantilever (154) structure (FIG. 15), struts (152), fan ducts (111, FIG. 11), engine pylons (52, FIG. 5), rudders (142), boom structure (6), or other bracing means, and/or to the wing tip area, via similar means (5, 143), simultaneously reduce drag and increase control. Many additional benefits are disclosed further herein. The extent to which this synergistic combination of benefits occurs varies by objective and by the degree to which one skilled in the art chooses to optimize his or her embodiment. However, in preferred embodiments, applying the invention described results in extremely high levels of efficiency not found in prior art.

The primary advantage of this invention is efficiency; not only aerodynamic efficiency but the enabling mechanical, structural, manufacturing, and economic efficiencies common to successful aircraft design. Defining this goal simply as the obtaining of a maximum of benefits at a minimum of costs, for aircraft designed under this disclosure, the major benefits offered by the invention comprise an extensive, interdependent list. These take the form of increased control authority; increased payload; lower lift-induced drag; lower surface drag; reduced power requirements; reduced fuel consumption; reduced complexity; reduced wingspan and tail height; reduced minimum speed; reduced weight; reduced runway length requirements; increased stability; increased structural strength and stiffness; increased top speed; increased cabin volume; increased control feedback; stall warning; prevention of stall; prevention of spin; coordinated turn behavior; improved aeroelastic dampening; and favorable center-of-mass excursion under increasing payload. Preferred embodiments add improved pilot comfort and workload reduction, efficient and favorable yaw coupling, enhanced visibility in all directions, short takeoff and landing (STOL) capability, large range of center of mass location, reduced noise, increased maximum altitude, high angle of attack maneuverability, and fully controlled, recoverable deep stall descent to this list. Significant reductions in drag, detailed herein, enable larger wing chords and greater wing area at a given span, which primarily lead to higher lift capacity, slower landings, and greater ability to specify large cabin area. Optimum non-elliptical wing lift distributions can be exploited for additional gain. Simultaneous drag reduction, weight reduction, simplification, and control enhancement provides beneficial utility in many areas.

Corresponding reductions in cost may be viewed in several ways as well. To start, owing to the extreme simplicity of the wings (4) and control surfaces (9,10), which in a preferred embodiment (FIG. 1) comprise two one-piece controllable airfoils (9,10) pivotably attached at their ends, costs due to manufacturing complexity and parts count are dramatically reduced. Indeed, the word "elevon" (9), the common term for a control surface combining the flight control functions (FIG. 22A) of the elevator (225) and the aileron (221), captures one such simplification that is enhanced, as disclosed (FIG. 1), by location and independence from wing airfoils, allowing the elimination of tail structure.

Testing of the invention has shown that the separate wingtip arrangement of independent aileron or elevon control surfaces (9,10) away from the downward-deflected airflow over a wing provide efficient, responsive control of aircraft without the weight and complexity of internal ailerons (221), elevators (225), or, optionally, flaps (222) in conventional wings (FIG. 22). This control extends to low speeds and unusually high angles of attack. Although separate external ailerons (9,10) may thus be placed above or below the wing (4), as well as fore or aft, a significant improvement captured in all embodiments shown results in separate ailerons (9,10) configured to produce downward aerodynamic force (231), or negative lift, in normal flight, opposing the lift (204) of the wings (4). Further teaching allowing elimination of elevators places the ailerons (9,10) behind the center of lift, thereby making them elevons (9,10). Further teaching regarding the disclosed method to obtain stall prevention refines their location to specifically above and behind the outer portion of the wingspan, which position further minimizes induced drag. In best practice, the span of the surfaces providing downforce ranges between one-third of wing semi-span and fully equal to wing semi-span.

Mechanical simplicity is central to the various embodiments illustrated for safety and cost reasons. Especially are large commercial aircraft costs improved by reducing the number and complexity of control surfaces. As mentioned, the elimination of outboard wing controls allows the entire wing (2,4) or its outboard portion (4) to be built to precise airfoil geometries in one piece, without regard for the internal mechanics of a conventionally controlled wing; a major cost savings both in manufacture and maintenance. Finally, widespread commercial adoption of composite materials is enabled and accelerated by simple structural design. Composites offer an indefinite lifespan that greatly exceeds that of aluminum aircraft. The invention thus offers economy through lower maintenance costs and extended service life in addition to savings through energy efficiency.

Elimination of chordwise flow disruption caused by control surface discontinuities, such as seams (223), hinge lines (224), and control surface deflections on a traditional wing (FIG. 22) makes low surface drag an easily attained object of the invention. Low-drag airfoils of the laminar flow variety are often desired for high performance aircraft. These airfoils frequently have a thin, highly loaded trailing edge that is challenging to articulate for control. Laminar flow airfoils are also typically sensitive to disruption; control surface deflection can cause adverse drag unlikely with other airfoils.

On a typical, conventional aircraft, (FIG. 22A) required movement of the control surfaces breaks the designed airfoil at the hinge lines to vary the lift. For example, downward movement of the left aileron (221) adds additional lift and drag to the left wing (226), while simultaneously the upward deflection of the right aileron (227) causes the right wing (228) to lose lift, and together the lift imbalance between the left and right wings causes the aircraft of this example to roll to the right. As the lift varies, so also does the drag. Imbalance in the drag of the left and right wings—from the two oppositely deflected ailerons—may be negligible, or may sometimes provide a desirable amount of lateral yaw in the direction of the turn. However, adverse yaw from roll input remains a common problem in prior art; pursuit of low drag further adds to the challenge of avoiding it. In general, airfoil geometries disrupted by a hinged control surface break (224) do not maintain their minimum predicted drag or allow highly reliable advance prediction of their characteristics in new designs. Further, should transition to turbulent airflow occur on a laminar flow wing, it is frequently accompanied by an abrupt, major increase in drag. This possibility amplifies any preexisting negative tendencies, and it can create them unexpectedly. Designers thereby face additional sensitivities that can produce unwanted yaw, pitch, roll, or stall when pursuing low-drag and/or laminar flow features on conventional aircraft designs.

By contrast, using the present invention in a preferred manner (FIG. 1) allows every flight surface to be highly optimized for minimum surface drag, since the airfoils of the wings (4) and control surfaces (9,10) are unbroken. This allows the invention to directly improve high speed performance, while simultaneously reducing the costs, weight, and complexity of construction. The large size and specific location of the elevons (9,10) create exceptional handling characteristics at both high and low speeds, while maintaining efficiencies in drag disclosed more fully herein, including such subtleties as a lack of wing pressure leakage due to absence of spanwise hinge gaps (223, 224). Behavior of a design can be more reliably predicted in advance, as each surface maintains fidelity to the lift and drag properties of its airfoil. Rudder requirements are reduced due to absence of adverse yaw. As a further advantage, flutter and other difficulties sometimes associated with all-flying (pivoting) airfoil structures (9,10) are readily overcome in the invention by means of end supports and sweep. Naturally, the foregoing does not preclude the use of conventional control surfaces, or additional control surfaces, when so desired (FIG. 14), nor is the invention limited to aircraft which are controllable, as free-flight aircraft and aircraft having fixed surfaces are equally improved by the teaching. In some cases, the unusual degree of control and safety afforded by the invention at high angles of attack, particularly in application of the stall resistance method disclosed following, allows reduction or elimination of flaps (222).

A key benefit of the invention is a major reduction of induced drag and its symptom, wake vortex, a spiral turbulence trailing the wingtips of most aircraft. Wingtip vortex is a huge problem unsolved in prior art. Vortex is created as a natural response to aircraft flight because suction from the mass of undisturbed air acts to efficiently equalize and organize the three-dimensional fluid movements created by lifting surfaces in motion, such as wings, which create a downwash in their wake, when the disruption caused by such airflows persists over time. This suction powers the outward, lateral, spanwise flow known as the "vorticular flow" occurring at the wing, generally observable as a strong spiral flow (161) upon its departure from the wingtip (FIG. 16C). Vorticular flow has a cause. In the simplest terms, higher pressure underneath lifting surfaces always tries to escape around the tip of the surface to the low pressure side, and if the motion resulting from its initial success is strong enough and continues over time, an acceleration occurs forming a strong vortex (161) downstream of the wingtip. This vortex is a symptom and a primary measure of induced drag. Thus, quickly acting against the wing downwash and vorticular flows with a sufficient volume of air reduces the time required to reach downstream equilibrium and the probability of vortex formation. This represents a reduction in the total energy imparted by the aircraft to the air and thus a reduction in lift-induced drag.

In a 1988 paper entitled Viscous Induced Drag, Greene describes an entropy-based approach to calculating induced drag which validates how the classically inadvisable, non-obvious design choices of the invention, illustrated in various embodiments, such as low aspect-ratio wings (FIG. 10A) and wing sweep (FIG. 3), achieve their surprising results. This theory of induced drag, which indirectly focuses new attention on the role of viscosity and four-dimensional factors in amplifying the effects of spanwise momentum, predicts the development of subsequent novel aircraft forms and wing configurations. Yet, until the present, both the calculation of induced drag and the form of aircraft capable of lowering it systematically have been mired in the legacy of models with two-dimensional ancestry, which build upon prior well-meaning simplifications with regard to the three-dimensional movement of air disturbed by an aircraft. However, a simple concept is all that is needed to discover the enabling principle of the invention as respects induced drag reduction: moving a large volume of air in the opposite direction of the strong airflows that power vorticular flow helps vortex to stabilize; or, more correctly, not form to a particular strength.

Modern efforts to lower induced drag often attempt to impart a counter-rotational force to the vorticular flow, with limited success. Some prior art purports to break the vorticular flow into smaller vortices, interfere with it, or destabilize it. However, small structures cannot move enough air without incurring major drag. Without adequate span or size of structures, or length over which to decelerate or interfere with vorticular flow, such efforts are severely disadvantaged. Instead, the present invention utilizes, in preferred embodiments, enlarged horizontal elevons (9,10) that span typically 62% of the wing (2,4) semi-span above the outboard portions of the wings (4) (FIG. 3). Being separate, inverted airfoils of large span (FIG. 15), these easily impart the required negative lift without a major drag rise. Doing so behind the center of upward lift, they provide the aircraft positive pitch stability, and further impart an upward momentum to a large fluid mass of air, in opposition and interference to the downwash caused by the wing (4). This opposing motion of air should occur over a wide area at the maximum lateral extent of the wing or lifting body (4) to most effectively moderate the displacement of airflow behind the aircraft, and can be used to add a counter-rotational vector component (162) to the immediate streamwise flow of disturbed air (FIG. 16C). These opposing flows created by the negative loading and substantial vertical separation of the opposing airfoil structure (9,10) above or below the wingtip tend to decelerate, interfere with and absorb the energies of wing (4) downwash powering vorticular flow (161). As a result, induced drag drops by more than 40% in some embodiments (FIG. 1). Such dramatically increased margin of drag reduction enables the practicer of the invention to trade design priorities with greater freedom.

While a few rare aircraft configurations appear at first glance to be similar to certain illustrated embodiments (FIG. 14 and FIG. 15), the invention operates very differently from all prior art. Unlike joined wing and boxwing designs which have large secondary wings providing positive lift, as mentioned, in all embodiments of the invention the secondary airfoils (141,154) do not contribute to the total upward lift of the aircraft; rather, they exert opposing, downward pressures (231) in the direction of gravity, in the same manner illustrated in the embodiment of FIG. 23. This condition is advantageously created in all embodiments by assuring that the aircraft center of gravity (203) is forward of the center of wing lift (204), establishing a positive pitching moment which must be counteracted by downforce provided by the secondary, inverted airfoils (9,10, 141, 154). In this regard, the invention is quite traditional.

Figure 22A:
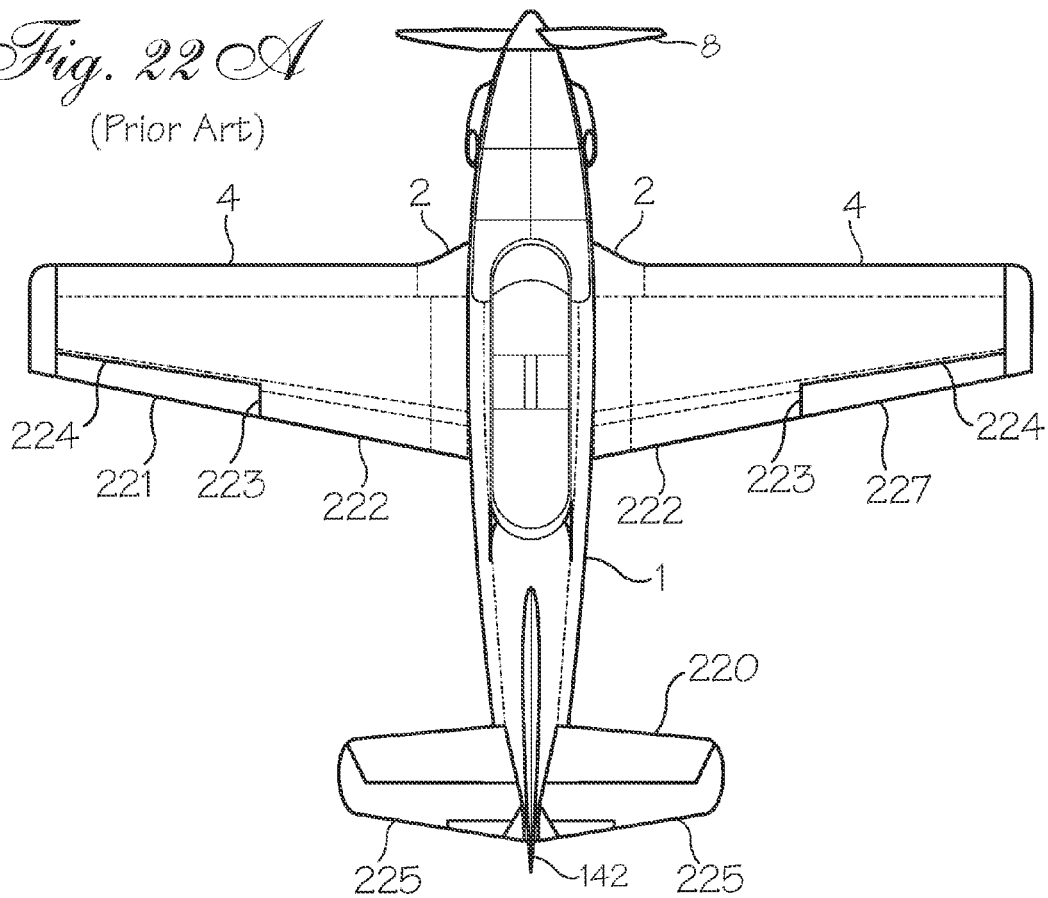
FIG. 22A is a top view of a conventional aircraft of prior art.
Figure 23:
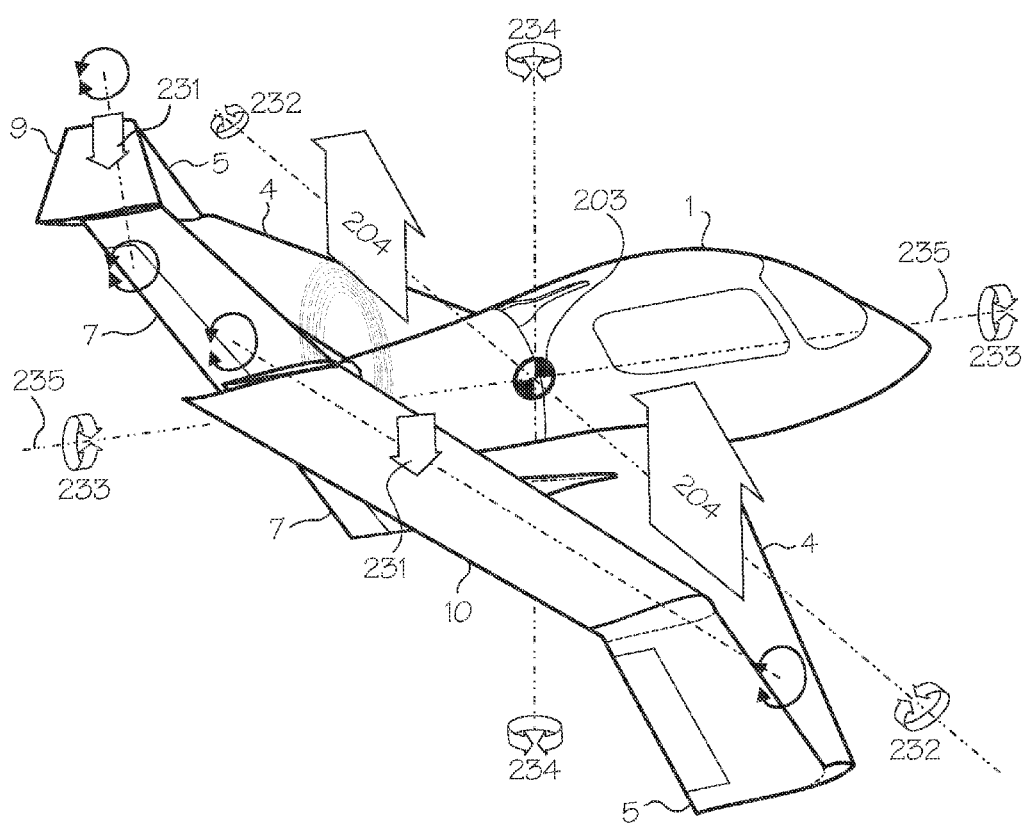
FIG. 23 is a perspective view of the aircraft of FIG. 1 showing the action of controls and the loading of flight surfaces.

On a typical aircraft of prior art, (FIG. 22A) greatest efficiency is obtained by locating the horizontal stabilizer (225), which typically also creates a downforce, considerably farther aft of the center of mass (203). This greater leverage in prior art allows the size of the horizontal stabilizer (225) and the amount of downforce to be minimized for drag reduction benefit. However, the invention counterintuitively enlarges control structure, reducing or eliminating the tail requirement and dividing the required pitch stabilizing function among external, supported elevon structures (9,10) more specifically placed behind the wingtip area; firstly providing the efficient, simultaneous control of pitch (232) and roll (233) (FIG. 23).

Eliminating tail structure shortens the moment arm providing pitch stability to the aircraft. Other things being equal, this action causes an increase in downforce loading on any newly placed structures, which has been a consequence avoided in prior art as it would increase drag. However in the invention, the resulting decalage (the difference in angle of attack between wing and stabilizer) and loading merely increases pitch stability, a benefit most notable in turbulence. Although the full-flying wingtip elevon (9,10) of a preferred embodiment of the invention can thus provide stabilizing counterforce (231) and exemplary control whether positioned anywhere from below the wing to above the wing (4), provided its centers of pressure are behind the center of wing lift (204), that it has adequate size, and provided that it creates negative lift by means of inverted airfoil geometry or angle of attack, maximum results in reducing drag occur when it is placed above the wing (4) and generally above the wing-influenced downflow of air over the wing. Induced drag benefits decrease significantly if the outer portions of the elevons (9,10) do not reach optimum locations above the wing tips, thus the practicer is advised to ensure that the outer tip of the elevons (9,10) are not moved inward (towards the central plane dividing the aircraft into left and right sides) by more than one-quarter of the wing semi-span.

Therefore as mentioned, instead of attempting to deal with the high kinetic energy of vorticular flow by means of small surfaces or small, fast-moving airflows, such as provided by vortex generators, winglets and other such wingtip devices in the prior art, airfoil structures (9, 10, 141, 154) spanning a high proportion of the wing span (4) are utilized to efficiently move enough air mass to gently absorb or oppose the streamwise development of strong vortex from the wing (4), by creating opposing airflows proximally above the outboard portion of the wing (4). If located behind the center of wing (4) lift, they can provide this function in their combined capacity as controllable elevons, thereby acquiring a bonus from the pitch stabilizing requirement while allowing the reduction or elimination of additional pitch control structure. As a result, equilibrium is reached more quickly in the wake of the aircraft, and induced drag is lowered using required forces rather than introducing new ones.

Where an upwardly extending elevon support structure (5) at the wingtip can be likewise utilized to provide a required force for control, such as stabilizing or controlling the aircraft in lateral yaw, it can be loaded to produce directed lift in contribution to stability and reduction of induced drag. However, unlike prior art, function of the upwardly extending elevon support structure (5) as a wing or winglet (FIG. 22B) is not a priority of the invention, and total drag may be minimized by keeping any desired aerodynamic functions to a bare minimum. The generally horizontal arrangement of downforce airfoils (9,10) positioned over or under lifting wingtips may be understood to provide the primary aerodynamic benefit, especially when controlled by means of rotation about a spanwise axis (FIG. 23). Structural benefits from negative loading of the ailerons (9,10) include reducing the root bending moment of wings if mounted upon the wings, however, making the use of upwardly extending support structure a carefully considered variable.

Operation of these elevons (9,10) in the preferred embodiment of FIG. 23 illustrate how principles of synergy employed in the invention achieve yet another novel combination of drag-reducing and control-enhancing benefits from required control forces in flight. Relative to the direction of fluid flow, as disclosed previously, the elevons (9,10) in normal flight encounter the air at a typically negative angle of attack, providing downward aerodynamic force (231). When roll is initiated, the action of the elevon (10) located on the rising wing (4) of the aircraft is to reduce its negative angle of attack, reducing drag and downforce on one side of the aircraft. This wing (4) is thereby accelerated and lifted, rather than slowed and lifted as in prior art; whereas the opposite elevon (9) increases angle of attack, desirably and simultaneously increasing aircraft pitch, elevon downforce, and favorable drag in yaw. Testing of a variety of embodiments has demonstrated that the invention consistently produces turns that are exceptionally well coordinated in all three axes with a single turn input, just like steering of a well designed motorcycle is accomplished by leaning. Adverse yaw is eliminated.

Furthermore, any increase in the aerodynamic loading (204) of the primary wing (4) in turns (FIG. 23) is accompanied by an increase in counterforce (231) from the elevons (9,10) in maintaining the increased pitch, thus uniquely moderating the drag increase that usually comes with maneuvers. Downward loading of the horizontal stabilizing structures (9,10,141, 154) also adds to the wing loading of the aircraft in flight, with corresponding benefits in speed, stability, ride quality, and reduction of apparent dihedral. These behaviors assist the aircraft of the invention to retain kinetic energy through turns to a remarkable degree, a highly desirable trait for racing aircraft in particular. (FIG. 9A) Further explanation of the fluid dynamic processes responsible for the drag reduction benefits of this structure are disclosed following.

Some practicers of the invention might desire to minimize the span and area of the elevons, or to reduce their chord, in pursuit of lower surface drag. However, a best mode practice is disclosed wherein the span of the elevon (9,10) elements, relative to the wing (2,4) semi-span, is divided so as to employ the "extreme and mean ratio" of approximately 0.618 to 1. Such spans assure that the elevons (9,10) create adequate force with minimum drag. Since the elevons (9,10) must retain sufficient authority to overcome high pitch moments at low speeds and high angles of attack; and at high speeds, without stalling; preferred embodiments will tend to lead the studied practitioner back to similar forms disclosed.

Best practice requires that the span, loading, and support of the elevon structures (9,10) conform to the specific teaching to obtain the full benefit offered by the invention for minimizing induced drag regardless of their position above or below the wing. However, the reader is reminded that induced drag reduction is only one of many beneficial results obtainable in use of the invention, and that it may not have top priority in every embodiment. Such excellent control is provided, and such efficiency is abundant, to allow the practicer wide latitude in implementation for particular goals, such as shorter takeoff and landing distances or very high speed flight. Nevertheless, the requirement for the elevon structures (9,10) to produce a downforce opposing the lift of the wings must not be subverted, as an unsafe and unstable loading condition would then exist. Some aircraft may require additional forward ballast or other measures to ensure that the center of lift remains appropriately behind the center of mass at all times, thus assuring that the stabilizers (9,10) are not tasked to create a typically positive lift.

Figure 15:
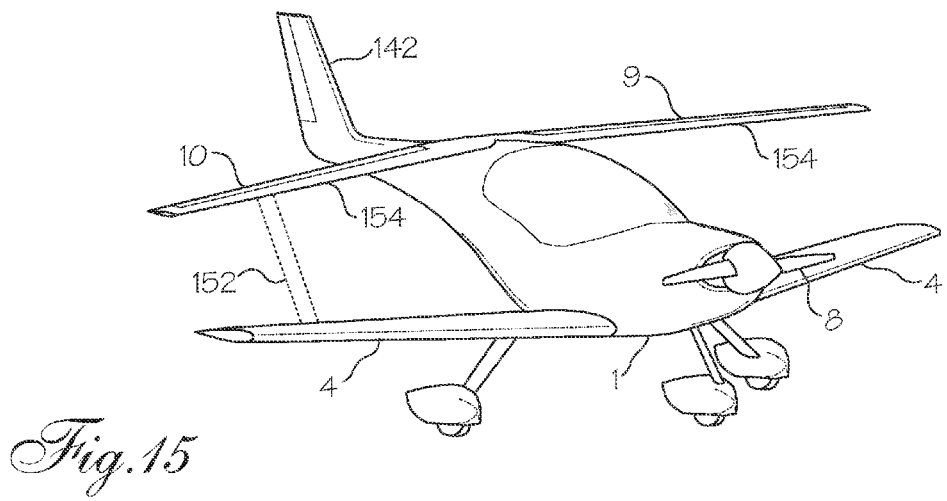
FIG. 15 is a perspective view of a cantilever biplane-style embodiment different from a canard or biplane of prior art in that the full-span secondary airfoils produce a downward aerodynamic force in flight.

Since no truly similar configuration exists to establish a designation for an aircraft having separate elevon, aileron, or stabilizer control surfaces supported away from the wingtips so as to provide downforce and full authority for the aircraft in roll and/or pitch; therefore henceforth I shall designate this configuration "double box wing". This term is intended to be convenient, rather than a limiting description of appearance, since while a majority of preferred embodiments present the visual consistency of a double quadrangle in front view, the invention is equally enabled by structures which locate controlling elements of the claimed arrangement without vertical end support (5). FIG. 16B embodies the invention in a configuration best described as T-wing. A similar alternative would merely stop the wing (4) at the upwardly extending elevon support (7). Small aircraft (FIG. 15) may particularly embody the invention wherein the elevon structures are cantilevered (154), or partially cantilevered (152) from the fuselage, as long as they are able to reach out to the wingtip area and are sufficiently strong and rigid, as in the embodiment of FIG. 15. This embodiment utilizes a rearward-swept lifting wing (4), which places the center of lift behind the center of mass, and a slightly forward-swept downforce wing (154), which together enable the prevention of stall in accordance with the method that follows. The reader is reminded that in such biplane- or boxplane-like embodiments, the forward, lower wing (2,4) carries the entire weight of the aircraft, plus the download from the winglike elevon structure (154) exerting negative lift; and that sweep and/or dihedral may be employed to obtain the stall prevention method disclosed; both of which stand in contrast to visually similar prior art.

Additional surface drag and additional wetted surface area are conditions usually avoided by the skilled aircraft designer. In order to achieve a net reduction in total drag, drag of the additional structures (5,7) supporting the control surfaces (9,10) must be minimized and balanced by reductions in control surface drag and fuselage drag as disclosed. However, the drag of unbroken, optimized foil structures (2,4,5,7,9,10) themselves can be quite low. Such drag is readily accepted when balanced by lower induced drag, such as in the design of sailplanes with very long wings. Many sailplanes are capable of very high speeds and very low total drag. Regarding the structures common to the invention as serving a similar function to the wingspan of a sailplane helps the practicer of the invention see efficiency (and, effectively, a high aspect ratio) rather than simply more surface drag, in enabling structures. Having eliminated the requirement for a long moment arm to oppose positive pitching moments in level flight, the invention (FIG. 3) rewards shorter, wider, area-ruled fuselage (1) designs and shorter boom (6) designs having reduced Reynolds number and viscous drag for a given volume. Coupled to propulsion designs that recover boundary layer drag from the fuselage, (FIG. 1, FIG. 11) the practicer of this invention is empowered to achieve previously unattainable results in the reduction of total drag.

The light weight of structure possible in the invention because of control simplification, shorter fuselage, and other factors enables further novel use of the configuration disclosed. Whereas certain practicers of the art are desirous of variable wing geometry methods, and whereas the use of boom structure (6), fuselage structure (1) fin structure (7) or other supportive structure in the vicinity of the wing root area (3) provides a natural change in wing thickness, thereby the configuration common to the teaching may be better adapted to retracting and extending wings than other designs. Attachment between the elevons, elements of supporting structure, and wings may be rotatably connected to allow controllable articulation of individual connections about an axis of rotation generally parallel to the longitudinal axis (235) of the aircraft. Such attachment would allow predominantly vertical elements of structure (5,7) in high speed flight to rotate toward the horizontal for additional lift capacity at lower speeds, to allow extending or retracting wings, or to change the angle of attack regulated by the stall prevention method described below.

By prescribing a more specific configuration of the elements of the invention thus described, a method for the prevention of inadvertent stall is disclosed as a further refinement of the invention. As is well known to those skilled in the art, at a point when the lifting foil surfaces of an aircraft (or other body moving through a fluid medium) encounter that medium at a greater angle of attack than that for which the lifting foil is capable of producing lift, the airfoil (or other lifting foil surface) stops producing lift and the airfoil is said to stall. Since stall is a function of the angle of attack rather than airspeed, a stall can occur under a wide variety of flight conditions, including, but not limited to: turns, during which the lifting surfaces are loaded by acceleration and the angle of attack is increased; lower air density, wherein the surfaces produce less lift than in a higher density medium, resulting in increased angle of attack to maintain a desired amount of lift; and pitch maneuvers, such as when the pilot initiates an increase in angle of attack for the purpose of gaining altitude, or for flare to reduce speed and rate of descent at the point of landing.

Therefore, an object of many inventors has been the effective prevention or prediction of stalls. Canard aircraft (FIG. 22B), in particular, have demonstrated a method for prevention of main wing (4) stall that is reliant upon stall of the canard (229) prior to stall of the main wing (4). A stall in the canard (229) allows the aircraft nose to drop, with a corresponding increase in airspeed, which drop reduces angle of attack and allows canard (229) recovery. Feedback, in the form of bobbing of the aircraft nose as this process occurs, further alerts the pilot to the onset of stall conditions. Canard aircraft are highly regarded, yet similar stall performance—without the canard—has largely remained elusive. Additionally, studies have shown that the configuration that offers lowest total drag is not canard (FIG. 22B), but rather aft-tailed aircraft (FIG. 22A).

Figure 18:
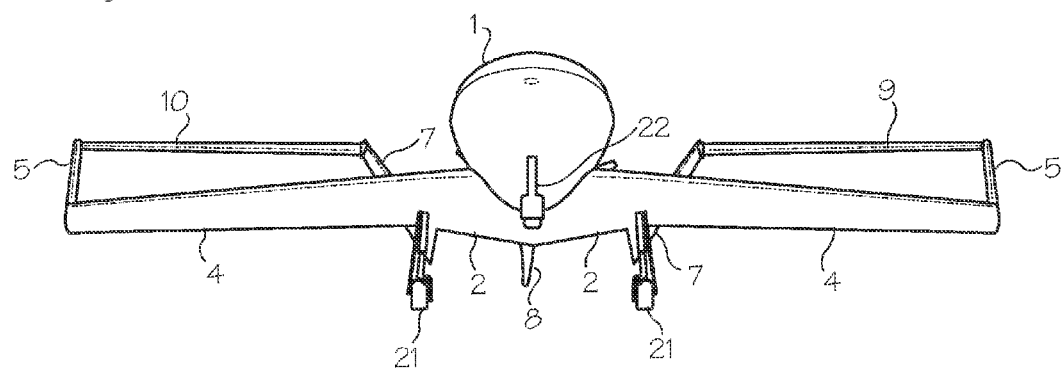
FIG. 18 is a front view of the aircraft of FIG. 1 at a high angle of attack.
Figure 19:
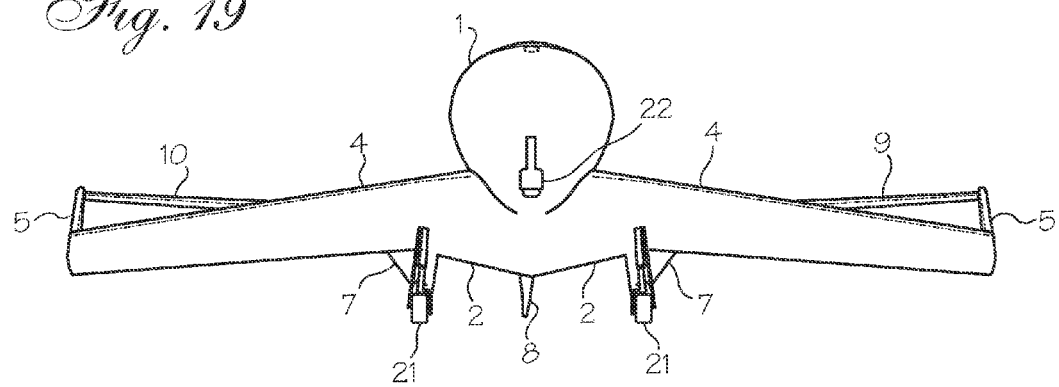
FIG. 19 is a front view of the aircraft of FIG. 1 at an angle of attack sufficient to illustrate the action of the method for preventing stall.

When an aircraft is configured per the preferred embodiment of FIG. 1, the reader skilled in the art will recognize that it comprises a superior method to achieve the long-sought goal of stall prevention, and that it provides exceptional control of an unstalled, partially stalled, or even fully stalled wing (2,4). FIGS. 18 and 19 show this embodiment from the direction of flight at a high angle of attack, and FIG. 20 illustrates the action schematically. Since the large elevons (9,10) must exert substantial downforce to achieve or maintain a high angle of attack of the wings (2,4) shown in FIG. 18, further increase in the angle of attack of the wings (2,4) must be initiated by an increase in elevon downforce. However, at angles of attack sufficient to create a stall condition on the main wing (2,4) (FIG. 19), the inboard portions of the elevons (9,10) are blanketed in the streamwise flow by the inboard portions of the wings (4). Being thereby deprived of freestream air in which optimum lift forces are created, that portion of elevon (9) closest to the fuselage, having the greatest moment arm to effect changes in pitch, begins to suffer a loss of lift, such that the elevons (9,10) maintain authority but cannot increase the pitch further. The precise angle (205), relative to the longitudinal axis of the wing chord, for positioning the inboard elevon (9,10) surface may be chosen to intentionally limit the ability of the aircraft to achieve angles of attack (201) that result in stall (FIG. 20). While in this position of high angle of attack (201), the elevons (9,10) outboard of the area of blanketing and interference remain in freestream air (202) and maintain full authority to roll the aircraft and to initiate downward pitch in recovery of normal flight attitudes. Additionally, that portion of the flight control surfaces being buffeted by turbulence sends tactile feedback to the pilot through the controls that a specific angle of attack (201) has been reached, regardless of airspeed or other misleading and irrelevant information. The aircraft will also then typically exhibit similar nose bobbing associated with the stall of canard designs, although for entirely different reasons. So informed, the pilot or automated flight control system is empowered to completely prevent unintentional stalls.

Sometimes stall is a design element. Aircraft which do not normally stall also cannot be intentionally flown at speeds below stall speed, or controllably descend at high approach angles and rates of descent that are below stall speed. However, the invention, when optimized for such, provides control that allows certain embodiments to be flown at very low speeds in a fully controlled manner. Aircraft may be designed that are capable of controlled descent at high angles of attack or deep stall, such that extremely short landings may be conducted at high angles of approach but at low rates of descent and low airspeed, promoting greater safety at the least and greater utility as an object. The required control deflections to effect this behavior in various embodiments tested are substantially less than required by prior art, and as a consequence of the size, placement, and operational characteristic of surfaces disclosed herein, transition to and from such deep stall condition is a smooth and predictable nonevent. Stall recovery may likewise occur gracefully. Certain embodiments have shown potential to descend steeply under full control in a parachute-like glide, yet transition to normal landings. With power on, slow and stable flight at speeds well below normal "stall speeds" can be performed. Consequently, novelty and utility exists for this unconventional configuration in that such capability exists within a reasonable range of flight control inputs and with greater safety and authority than prior art.

Whereas the canard configuration (FIG. 22B) causes stall of the pitch control surface (229) in obtaining stall prevention, temporarily rendering the control surface ineffective, proper use of the invention ensures that the outer majority of the elevons (9,10) do not stall prior to the main wing. Indeed, it may be observed that an increase in wing angle of attack is accompanied by a decrease in elevon angle of attack (FIG. 20), which behavior enhances pilot authority under stall and near-stall conditions. While both a properly designed canard surface (229) and the elevons (9,10) of the invention must carry similar total aerodynamic loads, the canard (229) of a canard aircraft (FIG. 22B) is a smaller, highly loaded flight surface having intentionally limited authority. Problems with rain or surface contamination, which can cause certain canard aircraft to fall catastrophically below minimum canard lift requirements, are less likely in the double box wing configuration since the downforce pressure (231) exerted by the larger elevons (9,10) in level flight is a small fraction of their total designed authority (FIG. 23).

Due to the location, size, and number of vertical or inclined stabilizer foils (5,7) found on the preferred embodiment of FIG. 23, together with rudder (7) travel limits, center of mass (203) placement, and full three-axis authority under most stall conditions, resistance to both upright and inverted spins is characteristic of this embodiment.

In order to achieve the maximum benefit of the method, the position of the inboard portion of the elevon (9) should be placed so that blanketing (FIG. 19) by the leading edge of the wing (4) begins at a prescribed angle of attack (201), chosen relative to the stall characteristics of the wing airfoil selected. (FIG. 20) The wing leading edge, from this point outward, should preferably sweep or curve back at a suitable angle to expose a greater portion of the outboard elevon to the freestream flow (202). Correspondingly, the elevon should preferably sweep forward from its rearmost position (A) inboard, to its forwardmost position (B) outboard (FIG. 3). The intent and effect of the method is that the wing (4) is at a selected, high angle of attack relative to the freestream flow (FIG. 19), and from this position (205), blocks the freestream flow (202) over an inboard portion A of the control surface, whereas the outboard portion B of the control surface, being at a greater angle (205) to the wing (4) than the angle of attack (201) is not so affected, and such that a gradual disruption due to wing interference is taking place at the elevon (9). (FIG. 20)

Although a combination of wing anhedral and elevon dihedral provides an alternative to sweep within the method, it should not be the object of design to sacrifice combined benefits of the invention merely to obtain the method regarding stall prevention. Wing (4) and horizontal stabilizer structures (9,10) should remain generally horizontal. Moreover, the height of the stabilizing control surfaces (9,10) above the wing (4) may advantageously be considered subject to wing semi-span (2-4) for optimum reduction of induced drag, and a best mode of practice is disclosed wherein the height is approximately 25% of the wing semi-span provided that the result remains above the generally influenced wing airflow. However, variation in this height is acceptable and relates directly to the angle of attack (201) being regulated (FIG. 20), and to wing chord with respect to the stall prevention method and the airfoil section characteristics.

DESCRIPTION OF PRIOR ART

U.S. Pat. No. 1,971,592 to Zaparka discloses aileron control surfaces distinct and separate from a wing which are configured to affect the flow over a substantial portion of the wing airfoil, being substantially located in the downflow over the wing. Unlike the present invention, this prior art is taught for aircraft having the usual stabilizer and elevator tail surfaces. It is therefore important to understand that this early prior art and the present modern invention are poorly related. Functions of each are opposing in nearly every respect, especially with regard to mode of operation: an aileron as taught by Zaparka is dangerous to the present invention, and the present invention applied to the prior art would likewise render it unsafe and dysfunctional. For example, as specifically disclosed, and referenced in all claims, a central objective of this prior art is to affect the airflow over the wing airfoil in order to increase the lift coefficient of the wing airfoil, which is quite opposite to the operation of the present invention. These positive-lifting ailerons of prior art are therein shown to produce a variable positive lifting force, both individually and in tandem with their mutual effect upon the wings, by assisting the attachment of flow over the wing. In the prior art, operating the ailerons to produce force opposite to wing lift causes an undesirable separation of wing airflow. This is an easily anticipated result, because the distance from the ailerons to the wing at their most distant exemplified placement is only approximately one-fourth of the wing chord length. In apparent response, the prior art teaches a floating aileron able to self-adjust to downflow in avoidance of negative lift and resulting airflow separation, yet, as in all claims, requires that the aileron remain substantially in the downflow over the wing.

For objectives not found in prior art, the present invention exclusively teaches negative lift from much larger and much more separate airfoils crucially positioned outside of, and spaced away from, the wing-influenced downflow as defined by Zaparka. Separation required by the present invention is typically many times greater than even the most separate placement claimed therein. In addition to teaching ailerons spaced at a distance sufficient to cause an independence from wing downflow, the present invention centers attention on the results of independent aileron action not in combination with the wings, and upon an opposite use of lift and drag in creating yaw. Further, the invention improves upon prior art by use of widely separated, larger external airfoils not only as ailerons but also as downforce elevons (9,10) for pitch stabilization and control, preferably along with elimination of conventional stabilizer and elevator surfaces. Unlike prior art, these significant improvements have little to do with lift enhancement, but rather, much to do with drag reduction and efficient control. The above applies equally to other similar art, such as Junkers flaps.

U.S. Pat. No. 3,834,654 to Miranda teaches a boxplane (boxwing) aircraft having certain similarities in appearance to some embodiments of the present invention. However, any resemblance is superficial. Box-wing and joined-wing aircraft of the prior art are canard or tandem wing designs wherein both lifting surfaces, fore and aft, are always arranged to provide substantial positive lift. None of them would fly if the secondary wings exerted substantial downforce in normal flight. In addition, since the disclosure of this and similar inventions, numerous attempts have been made to develop aircraft according to the teaching. As a result, a fundamental flaw has been observed; tandem wing aircraft are susceptible to unrecoverable conditions caused by loss of lift on the rear wing and to stability problems due to tandem loading.

U.S. Pat. No. 4,146,199 to Wenzel, regarding a biplane joined-wing aircraft having a lifting fuselage, well illustrates the factors complicating stability for aircraft that resemble my invention but which do not stabilize the aircraft in pitch by means of rearward airfoils producing downward force rather than positive lift. Such aircraft are highly susceptible to spins and stalls. As in all joined wing and box wing prior art, the rearward wings of this prior art provide positive lift. Therefore, despite a few visual similarities, no prior art is found relative to the present invention as a whole.

As should be expected, much prior art is found relative to various methods for reduction of induced drag which are unrelated to the present invention. The majority of such art has focused primarily upon the design of wings and to improvements thereto. By contrast, this invention is not concerned with wing or winglet designs, wingtip apparatus, joining structure, or the continuity of vorticular flow. Much prior art directs emphasis to the attempted control of symptoms, rather than their cause. Drag sources critically targeted in prior art—such as discontinuity, shed vortices, and interference—are well tolerated in the invention disclosed herein, since, as in all aircraft, many flow phenomena occurring at the wings are powered by the energies previously imparted to their wake, and this invention minimizes such energies, much as ground effect reduces vortex phenomena for conventional aircraft. While the invention offers lower induced drag in providing multiple benefits relating to multiple efficiencies, its practice should not be understood as limited to embodiments having drag reduction as the primary priority, nor constrained by unrelated teachings found in prior art, which is frequently defective. Thus, although the configuration of this invention a offers wide variety of options which tolerate many common methods for the joining and filleting of the airfoil surfaces and/or other supporting structure when (and if) it is used, none is herein specified.

While the principle of the invention is made clear in the illustrations and embodiments shown and described, it is immediately recognized by those skilled in the art that many modifications are possible and may be made within the scope of the present invention for the specific application and need of the practitioner without departing from the spirit of the invention disclosed, and the invention includes all such modifications. Therefore, in view of the foregoing and in accordance therewith, I claim this invention with all rights reserved.

DETAILED DESCRIPTION OF THE DRAWINGS

FIG. 1 shows an aircraft having a single engine driving a propeller (8) in the so-called pusher configuration; comprising a large fuselage (1) with capacity for at least six individuals and baggage; designed for long range high speed operation with achievable STOL capability. The aircraft has a swept, low wing lifting foil structure (4); upwardly extending elevon support structure (5) at the wingtip; forward sweeping elevons (9,10) pivotably attached at their ends, comprising two controllable airfoil structures providing downforce; their inboard ends supported by inclined vertical stabilizers (7) attached to short booms (6) extending from the wing root/removable wing panel (4) junction (3). The wing root (2) is thick and of large chord in order to effectively transfer flight loads; including in particular torsional loads; to facilitate removable wings, retracting landing gear, and to accommodate fuel. This aircraft is a preferred embodiment designed by the inventor and is called Exponent. As in a majority of embodiments, composite construction is used extensively.

Figure 2:
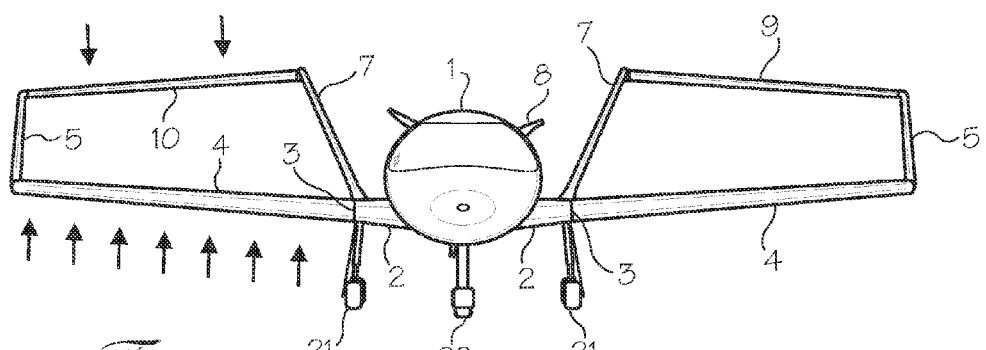
FIG. 2 is a view of said aircraft from the front.

FIG. 2 shows the aircraft of FIG. 1 in front view and the direction of lift provided by the arrangement of lifting foil structures in normal flight. Loading of the elevons (9,10) is downward and generates approximately 6% to 12% of the aircraft weight at an angle of attack selected for minimal drag. Landing gear (21) attachment is beneficially located in an area of structural advantage and may be retracted. All structure outboard of landing gear (21) may be removable and/or foldable to promote roadability, transportability, and storage. A significant percentage of drag losses due to boundary layer fuselage (1) friction are recaptured by the wake-immersed design of the propeller (8).

FIG. 3 shows the aircraft of FIG. 1 in top view. Outboard wings (4) are swept at 137.5 degrees of included angle at a reference chord position. Fuselage (1) loading provides for favorable balance with a large rear engine (31) and two persons seated forward. Additional payload adds to forward movement of the aircraft center of mass for appropriate handling under increasing weight. Fuel, and up to one half of payload, is carried at center of mass at the wing root (2). Section lines A-A and B-B are indicated referencing the sectional views of FIG. 20.

FIG. 4 shows the aircraft of FIG. 1 in side view. Vertical stabilizer foil structures (7) having rudders and speed brakes provide lateral stabilization behind the center of mass. Propeller (8) tip noise is moderated by the presence of this structure (7) immediately to either side. Elevons (9,10) provide downforce above and behind the wing (4) such that the outboard ends are less behind the wing (4) and the inboard portions are more behind the wing (4). This relationship enables the claimed method and is illustrated further in FIG. 20. Steerable nose gear (22) retracts into the fuselage (1).

Figure 5:
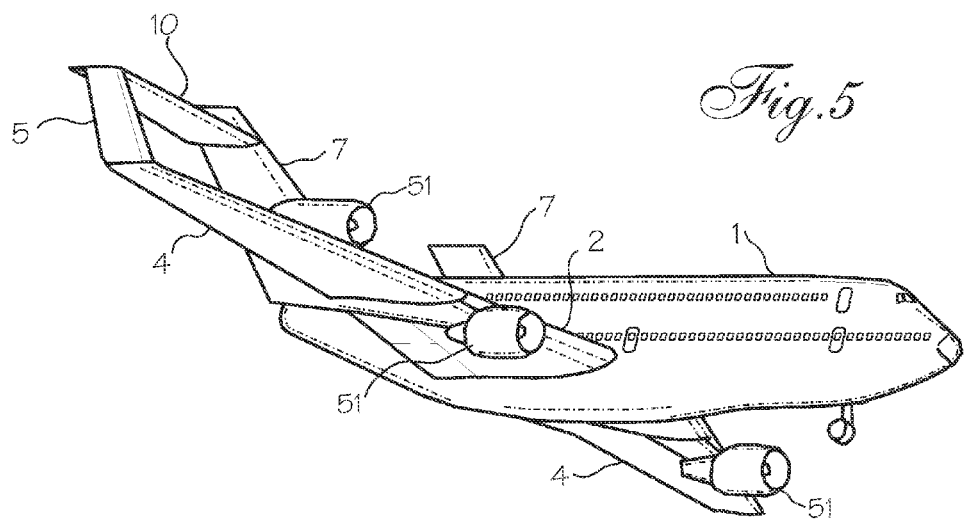
FIG. 5 is a perspective view of a Very Large Transport aircraft embodiment.

FIG. 5 shows the invention applied to an aircraft of similar size to the Boeing 747, having a larger fuselage (1) with two decks. The invention allows for an increase in wing area and a reduction in wing twist (washout) with numerous benefits. A reduction of conventional wing complexity is advocated as an attainable object of the invention.

Figure 6:
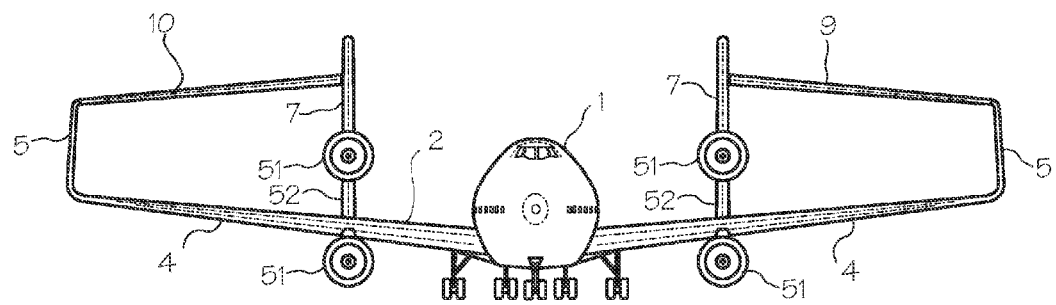
FIG. 6 is a front view of the aircraft of FIG. 5.

FIG. 6 shows the aircraft of FIG. 5 from the front. Rudder structure (7) combines with pylon structure (52) for the support of elevons (9,10), supporting engines (51) closer to the aircraft centerline to provide enhanced lateral stabilization and control in conjunction with outboard rudders (5). Engines (51) shown above wings may also be fuselage mounted.

Figure 7:
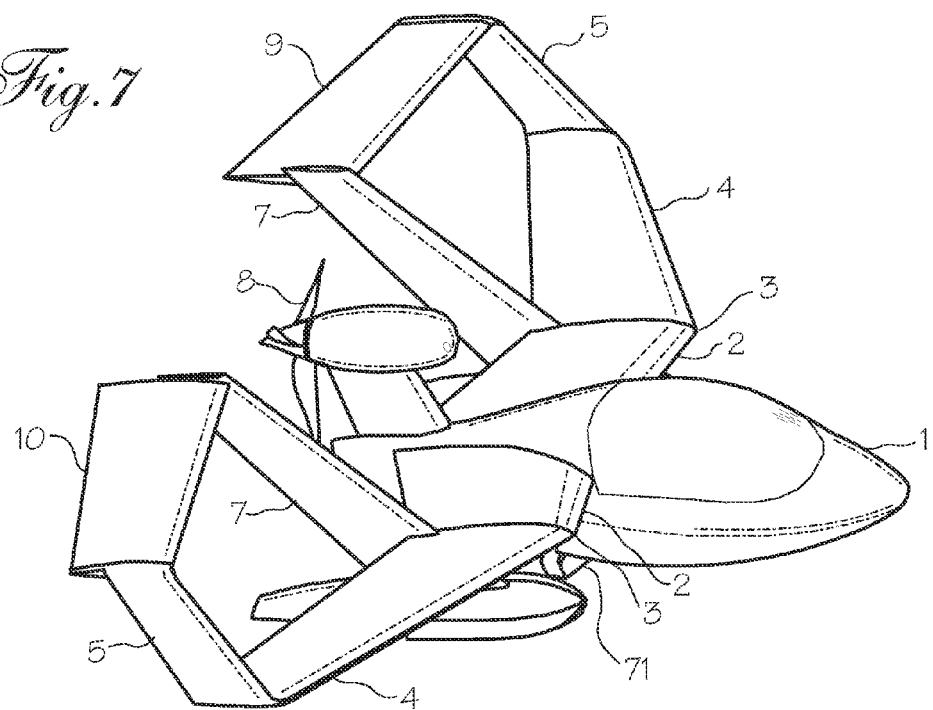
FIG. 7 is a perspective view of an amphibious aircraft or seaplane embodiment having also a hydrofoil embodiment.

FIG. 7 shows the invention applied simultaneously to a seaplane and to a lifting foil hydroplane (71) used to assist the seaplane on takeoff. This embodiment further displays a wing root (2) having negative sweep, an advantageous solution allowing the claimed method when wing sweep would otherwise place the center of lift too far aft (see also FIG. 21).

Figure 8:
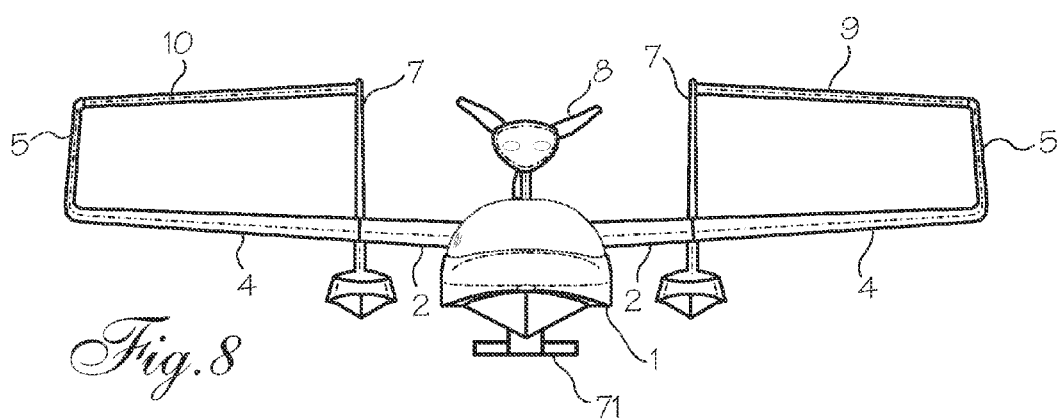
FIG. 8 is a front view of the aircraft of FIG. 7.
Figure 22B:
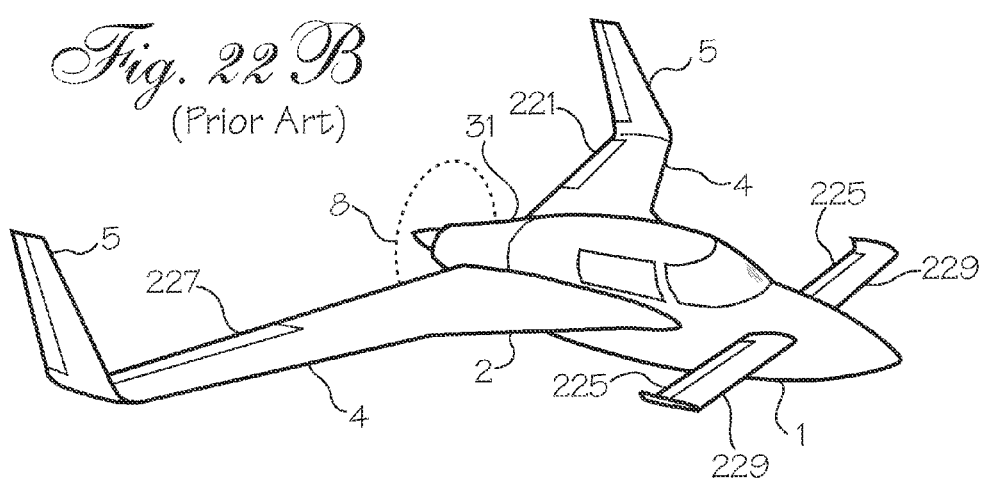
FIG. 22B is perspective view of a canard aircraft of prior art.

FIG. 8 shows the aircraft of FIG. 7 from the front. The high wing configuration of aircraft can benefit as readily as the low wing configuration from the invention, as the apparent dihedral of the invention is lower than that of a wing (4) having winglets (5) of similar height (FIG. 22B). For amphibious aircraft, overcoming the drag of water while accelerating to takeoff speed is key, and the novel arrangement of controllable foils disclosed achieves equally improved effect in water, as fluid dynamic similarity is well understood by those skilled in the art. The improved hydroplane (71) is thus able to provide substantial lift with minimal drag at lower speeds than the wings, thereby lifting the aircraft free of water drag to better enable acceleration to flight speeds.

Figure 9:
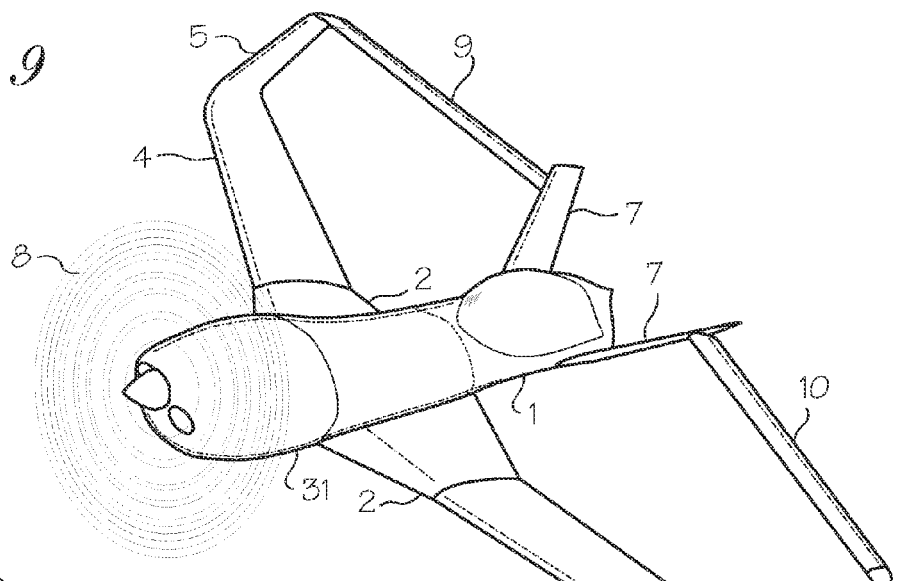
FIG. 9 is a perspective view of a racing aircraft embodiment.

FIG. 9 shows an aircraft having a forward engine (31) configuration for high propeller (8) efficiency, such as may particularly be advantageous for racing aircraft. Other, twin engine, racing aircraft are especially able to exploit the invention when engines are aligned with twin fuselage booms in the manner of the P-38 aircraft.

Figure 10A:
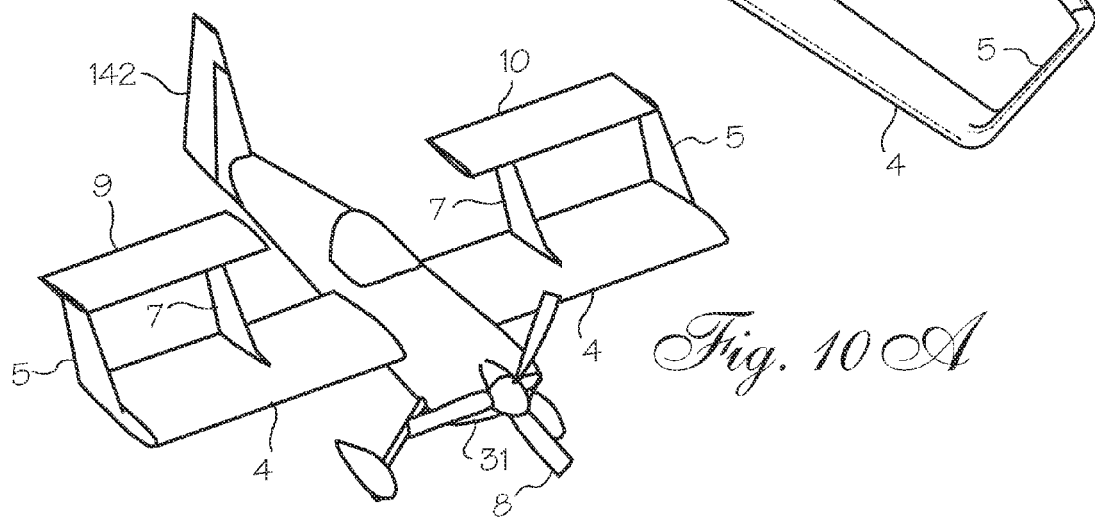
FIG. 10A is a perspective view of an aerobatic aircraft embodiment.
Figure 10B:
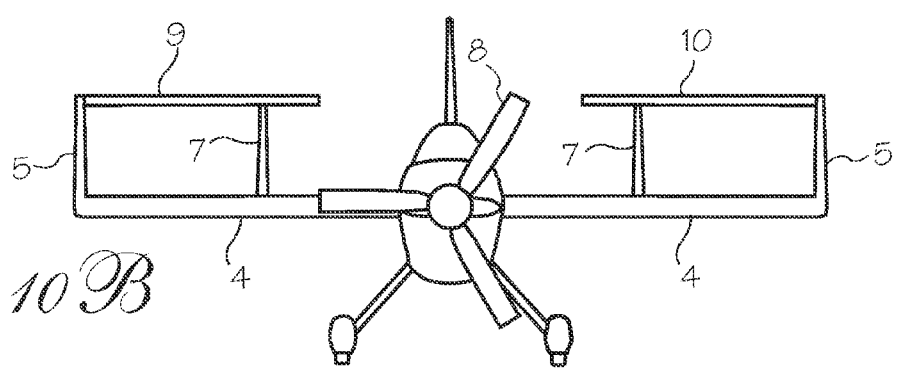
FIG. 10B is a front view of the aircraft of FIG. 10A.

FIG. 10A shows an efficient double box wing biplane, configured per the disclosed teaching for negatively loaded, full-flying, external, supported (7) wingtip elevons (9,10). It should also be noted that all embodiments illustrated are aerodynamically capable of fully controlled inverted flight, but that the disclosed stall prevention method applies only to positive G maneuvers. FIG. 10B shows the aircraft of FIG. 10A from the front.

Figure 11:
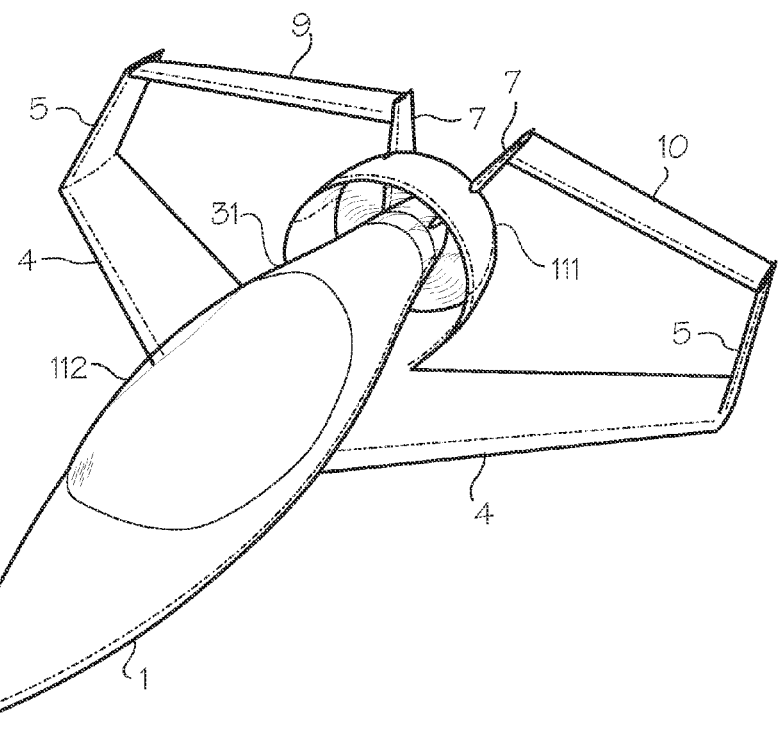
FIG. 11 is a perspective view of a ducted fan propelled embodiment.

FIG. 11 shows the invention as a fighter-style aircraft, having unobstructed canopy space (112) ahead of wings (4) and engines (31). This embodiment offers the pilot and passengers excellent visibility and features wake-immersed ducted fan propulsion capable of recovering fuselage drag when properly designed. Duct structure (111) shown may thereby be useful in support of elevon (9,10) structure. The exceptional maneuverability and energy retention typical of all embodiments of the invention makes their flight ideally suited to high performance sport aircraft, regardless of propulsion. Military aircraft can be expected to fully exploit the invention in similar manner.

Figure 12:
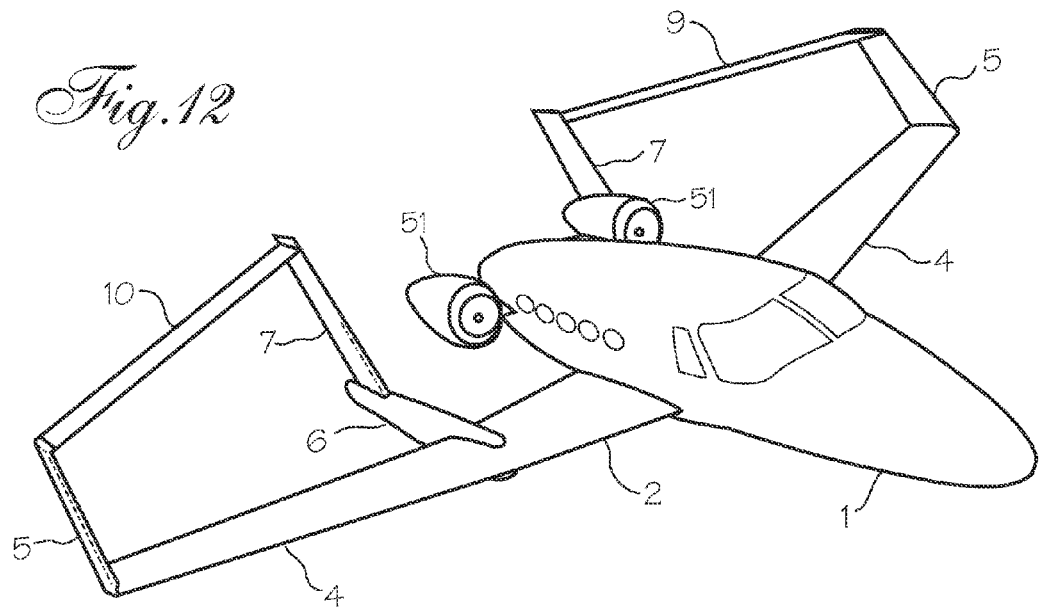
FIG. 12 is a perspective view of a twin engine business jet embodiment.

FIG. 12 shows a twin engine business jet embodiment having boom structure (6). An increase in wing area and total aspect ratio (together with a decrease in apparent wing aspect ratio) improves handling, strength, and fuel storage over prior art while reducing runway length requirements.

Figure 13:
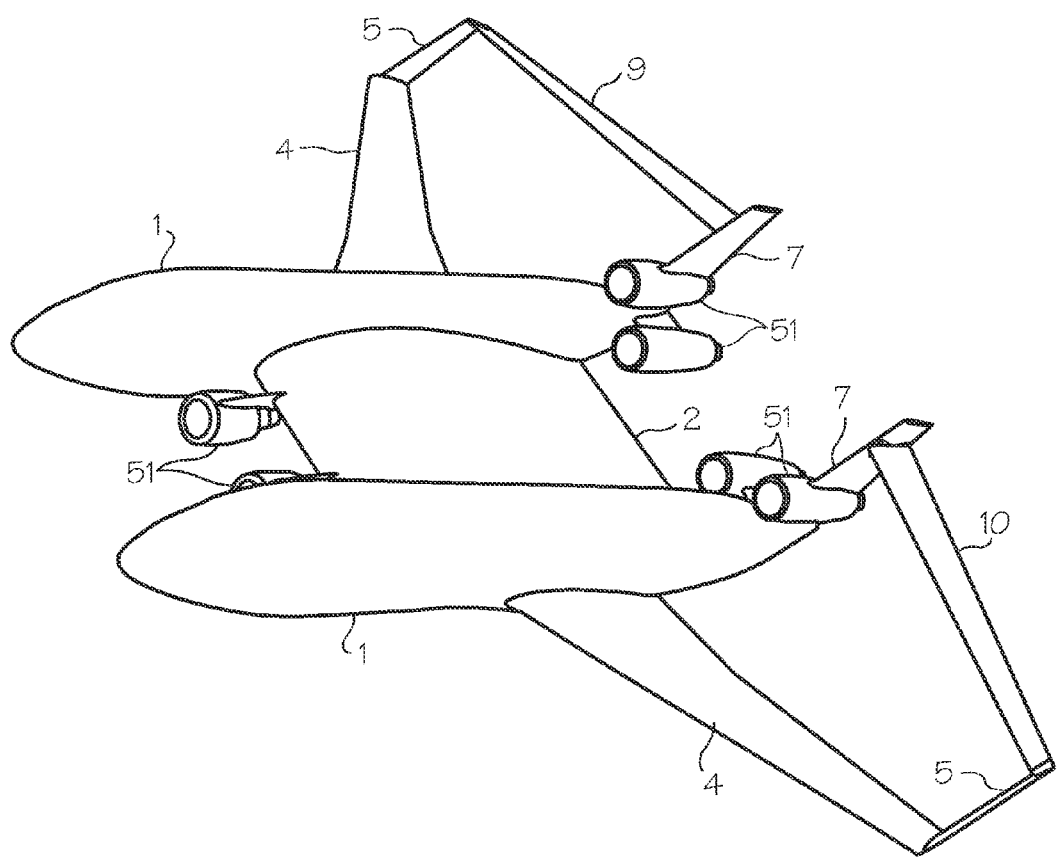
FIG. 13 is a perspective view of a multiple fuselage Very Large Transport aircraft embodiment.

FIG. 13 shows an aircraft having multiple fuselage bodies (1) serving as support structure. The invention allows such enormous aircraft to maximize wing area without a large penalty in induced drag, and further enables realistic use of central wing (2) and fuselage structure for passengers, cargo, freight, and fuel. Since wing span is a constraining limit to very large aircraft, the invention represents a realistic solution to enable their further development. Control features incorporated into the wings (2,4) may be considerably less extensive than required in prior art.

Figure 14:
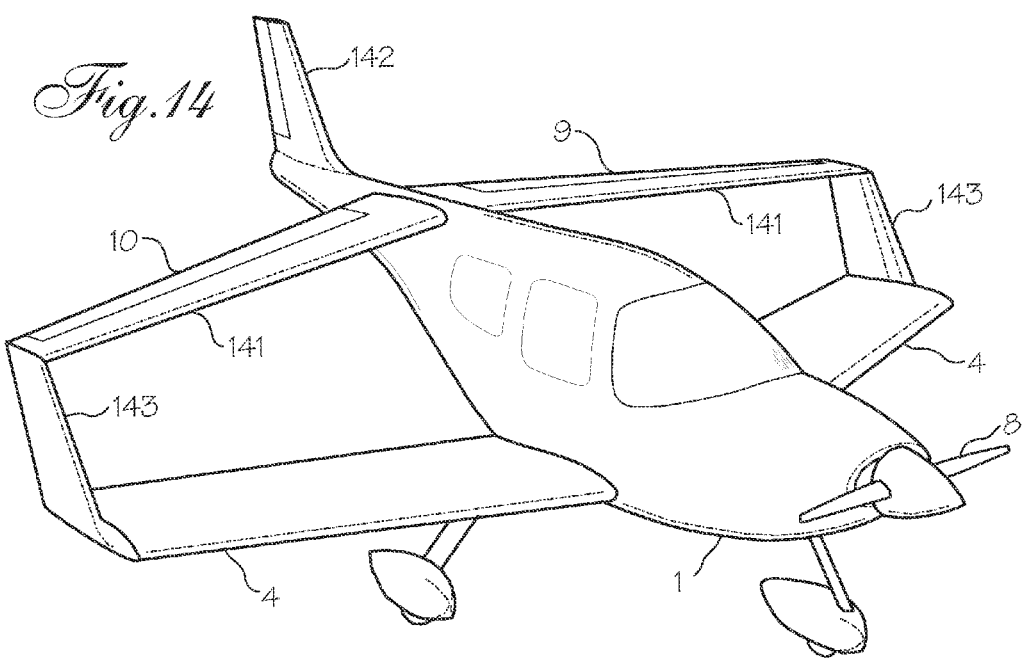
FIG. 14 is a perspective view of a fuselage-supported embodiment different from a boxplane of prior art in that the full-span secondary airfoils produce a downward aerodynamic force in flight.

FIG. 14 shows an aircraft having a boxplane-like configuration, but wherein the controllable upper horizontal stabilizer structure (141) exerts a generally negative downward force in level flight. In smaller aircraft of the same arrangement (FIG. 15) suitable supporting structure to enable the invention may consist solely of at least one inverted, cantilever elevon structure (154) providing downforce, whereas larger similar craft may require supporting struts (152) or outboard wingtip structure (143). Opposing lift and opposing vorticular flows from the flight surfaces reduce streamwise vortex development, maintaining benefits of the invention over prior art in either case. However, diminishing benefits are realized as the span of the control structures (141,154, 9,10) is reduced below the wingspan, therefore the practicer is advised to maintain an upper structure span close to that of wing (4) span to keep the control surfaces substantially above the end of the wing (4). As in all embodiments, the airfoils providing downforce must remain spaced from the wing-affected downflow. Although not having full-flying elevons, cantilever biplane-like embodiments such as illustrated in FIG. 15 represent a particularly pure and excellent form of the invention.

Figure 16A:
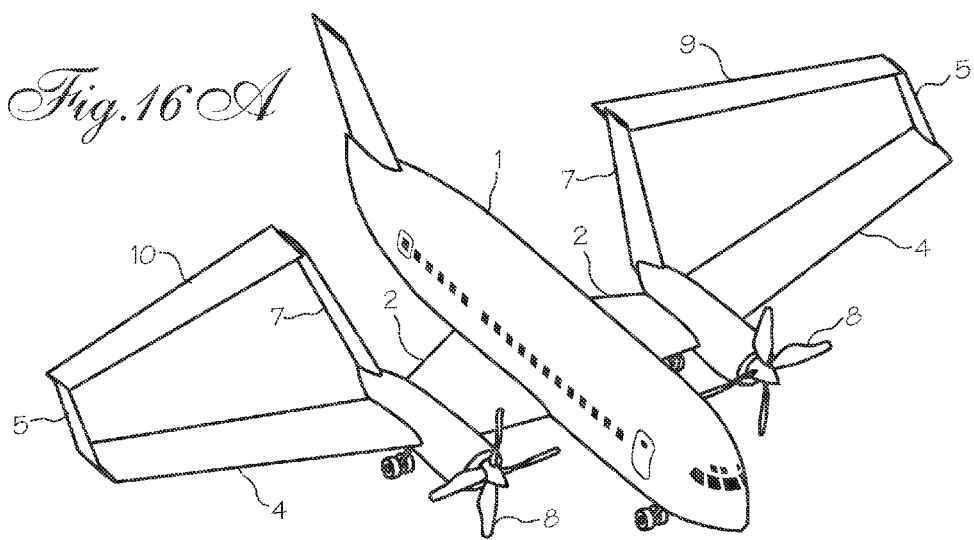
FIG. 16A is a perspective view of a twin engine aircraft embodiment.
Figure 16B:
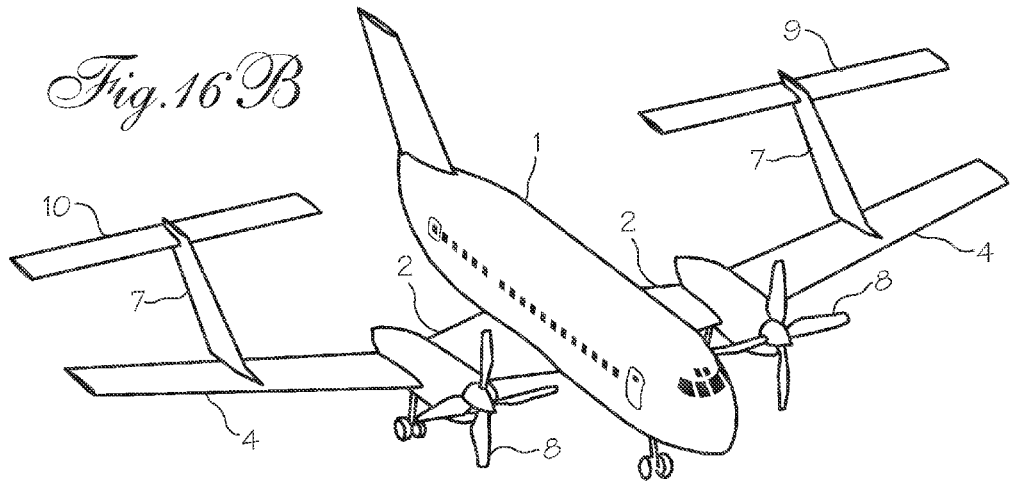
FIG. 16B is a perspective view of an alternative embodiment of the aircraft of FIG. 16A.
Figure 16C:
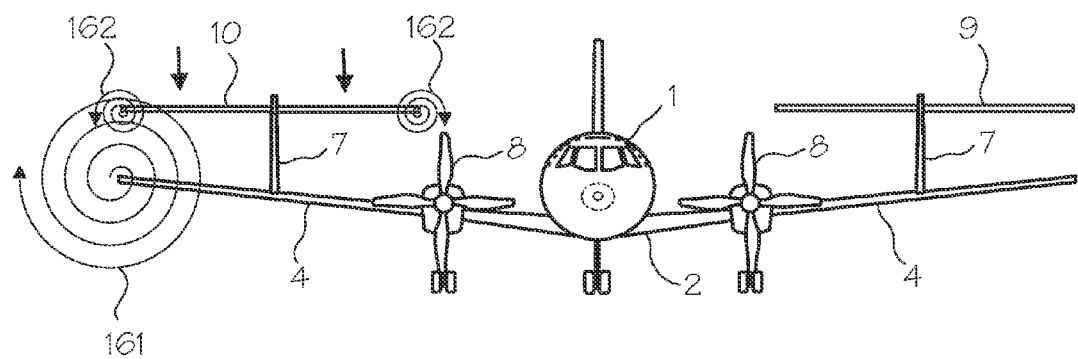
FIG. 16C is a front view of the aircraft of FIG. 16B.

FIG. 16A shows a twin engine (31) aircraft of conventional type reconfigured to employ the invention. Elevons (9,10) are swept forward to allow outboard portions to remain in freestream air at high angles of attack while improving their stability. Aircraft having lesser wing sweep may thus incorporate the method for the prevention of stall.

FIG. 16B shows a twin engine (31) aircraft wherein the pivotable elevons (9,10) are centrally supported (7) and maintain independence from wingtip support structure. Aircraft supporting unswept elevons (9,10) in this manner benefit from a rearward sweep and/or anhedral (negative dihedral) of the main wing (4) leading edge to incorporate the stall prevention method. Further, the location of the support structure (7) can also be placed at or near the wingtip in claimed embodiments. This configuration of the invention begs the designation T-wing.

FIG. 16C shows the T-wing embodiment in front view. Vorticular flow (161) from the elevons (9,10) opposes that of the wing (4) outboard and that of the propeller (8) wash inboard for drag improvement over prior art.

Figure 17:
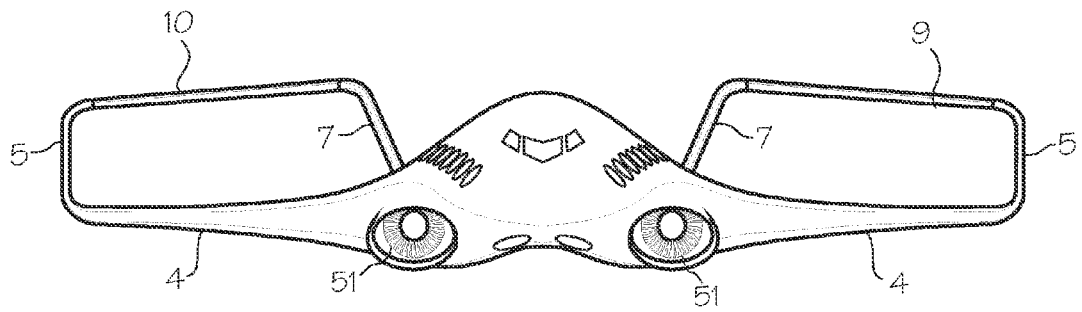
FIG. 17 is a perspective view of a blended wing body embodiment.

FIG. 17 shows the invention applied to a blended wing-body (BWB) aircraft. Rethinking BWB designs in light of the invention opens many doors to innovation, since maximum wingspan is not required for induced drag reduction, whereas optimal wing loading along with improved stability and control remain primary obstacles to the greater success of flying wing aircraft. In this embodiment, structure (7) supporting the elevons (9,10) at their inboard locations provides highly desired yaw stability, as do wingtip structures (5). Shorter, more highly loaded wings (4) may be built without the characteristic twist of typical flying wings, and using positive pitching moment airfoils; again improving efficiency.

FIG. 18 shows the aircraft of FIG. 1 from upstream of the relative wind at a high angle of attack. Elevons (9,10) are at a relatively lower (negative) angle of attack than the wings (4) and remain in freestream air at all times, even if the aircraft is yawed or slipped. Exceptional control is assured.

FIG. 19 shows the aircraft of FIG. 18 from upstream of the relative wind at a critical angle of attack approaching stall. Inboard portions of the elevons (9,10) are no longer visible in the freestream air, and the downforce required to maintain the high angle is borne by the outboard portion of the elevons. Loss of downforce caused by blanketing of the elevons (9,10) by the wing (4) causes the angle of attack of the wing (4) to be lowered, averting main wing stall.

FIG. 20 represents the condition of FIG. 19 in two simplified sectional views A-A and B-B, which reference the section lines shown on FIG. 3. Referring to Section A-A, at a selected high angle of attack (201), the primary wing (4) blankets the freestream flow (202) over the inboard portions of the stabilizer control surface (9), depriving it of freestream flow (202) and substituting turbulence, thereby reducing its ability to impart downward force in maintaining a high angle of attack (201) of the wing (4). However, further outboard (Section B-B), at the same angle of attack (201), outer portions of the elevon (9) remain in freestream flow (202), providing full roll and pitch authority for the aircraft. Placement of the elements (4,9) varies by distance and angle (205), which forms a basis for specifying a desired behavior in the limiting of stall.

Figure 21:
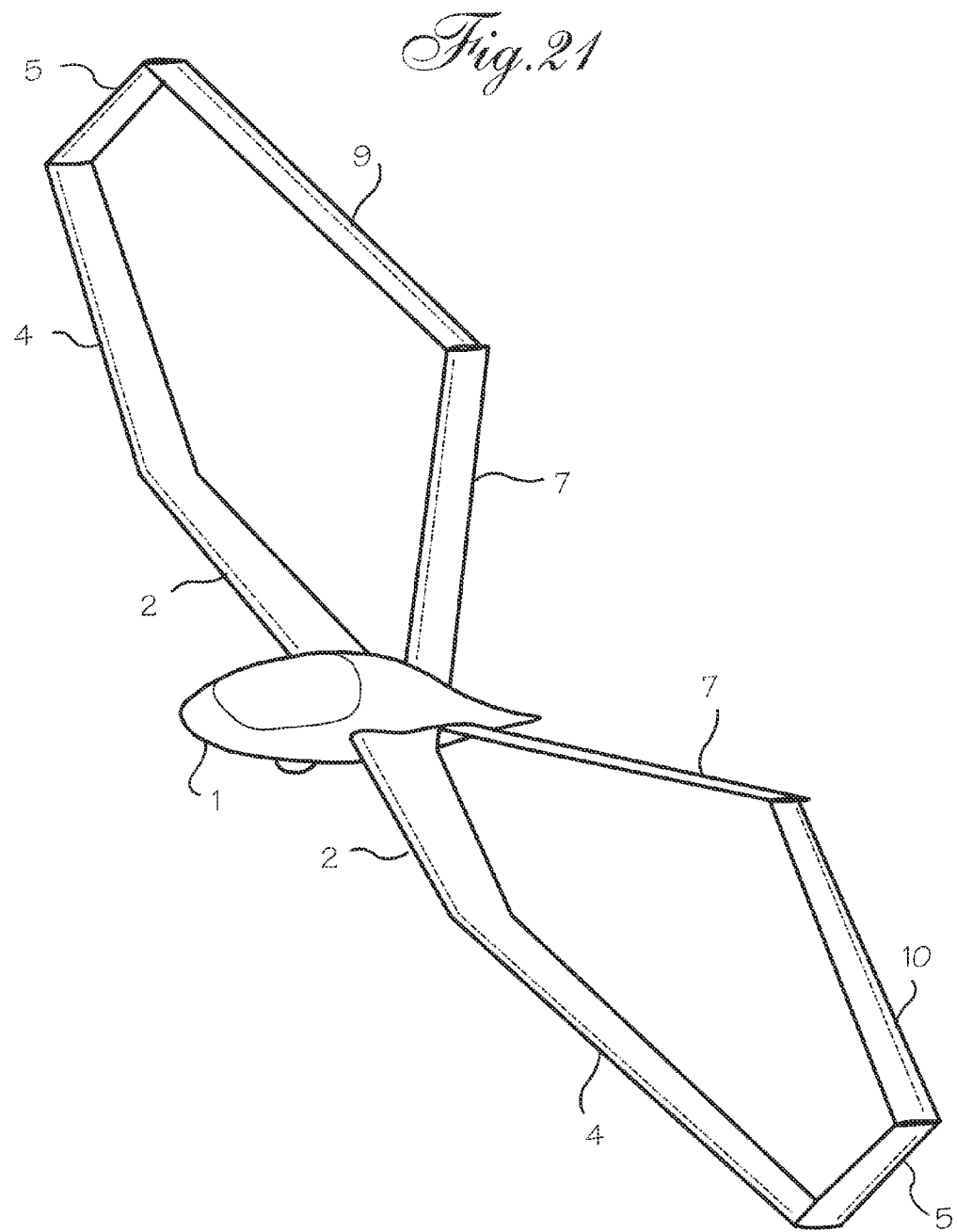
FIG. 21 is a perspective view of a sailplane embodiment.

FIG. 21 shows a compact sailplane embodiment of the invention. A shorter wingspan having the same low drag as a conventional, long wingspan allows higher wing loading at a lighter weight, improved structural performance, and increased speed envelope in addition to advantages due to size.

FIG. 22A (Prior Art) A conventional low wing aircraft is shown for reference to fuselage (1), wing root (2), wing (4), aileron (221, 227), elevator (225), flaps (222), seams (223), hinge lines (224), and horizontal stabilizer (220).

FIG. 22B (Prior Art) A canard pusher aircraft is shown for reference to fuselage (1), wing root (2), wing (4), winglet (5), engine (31), propeller (8), aileron (221, 227), canard (229), and elevator (225).

FIG. 23 shows the action of the horizontal control surfaces (9,10) and the primary control axes (234, 235, 236) of the aircraft of FIG. 1. Wings (2,4) exert lift upward, having a center of lift illustrated for convenience as bilateral centers of lift (204) longitudinally aft of the center of mass (203). This condition creates a nose-downward (positive) pitching moment that must be balanced by downforce (231) from the elevons (9,10) in normal flight. The longitudinal distance from their center of aerodynamic pressure (231) to the center of mass (203), and their area, weight, and section properties are chosen so that a downforce (231) approximately equal to 6% to 12% of the vehicle weight may be exerted in trimmed cruising level flight with minimal drag.

I claim:

1. An apparatus forming an aircraft which is designed for flight by movement through the air, said aircraft having front and rear portions and a center of mass, said aircraft having left and right sides when divided by a central plane of reference, said aircraft having thereby inboard portions closer to said central plane of reference and outboard portions farther from said central plane of reference, comprising:

at least one aerodynamic lifting surface configured to affect the flow of air near said at least one aerodynamic lifting surface when said aircraft is appropriately moving forward, said at least one aerodynamic lifting surface thereby configured to create positive lift when said aircraft is appropriately moving forward, said at least one aerodynamic lifting surface thereby forming at least one wing, said at least one wing having a center of lift which is rearward of said center of mass of said aircraft in flight;

at least one airfoil structure comprising a means for creating aerodynamic force when said aircraft is appropriately moving forward, said at least one airfoil structure positioned predominantly rearward of said at least one wing and entirely above said at least one wing, said at least one airfoil structure having a direction of aerodynamic force generally opposite that of said at least one wing when compared to said at least one wing, thus providing the aircraft with positive pitch stability when the aircraft is in trimmed level flight, wherein said means for creating downward aerodynamic force by said at least one airfoil structure is said at least one airfoil structure having an inverted angle of attack when compared to said at least one wing in trimmed level flight, said at least one airfoil structure spaced from said flow of air near said at least one wing, said at least one airfoil structure occurring on both said left and right sides of said central plane of reference, said at least one airfoil structure having at least one center of aerodynamic force which is rearward of said center of lift, said at least one airfoil structure is of sturdy construction appropriate with regard to said aerodynamic force, said at least one airfoil structure is adjustable to vary said aerodynamic force of said at least one airfoil structure to thereby provide at least partial control of said aircraft when said aircraft is appropriately moving forward;

wherein said at least one airfoil structure is constructed so as to have outboard portions thereof positioned outward of said central plane of reference to a distance at least four-fifths of the distance from said central plane of reference to a tip end of said at least one wing and wherein the aircraft center of gravity is forward of said center of wing lift.

2. An apparatus according to claim 1 wherein the at least one airfoil structure is spaced from the at least one wing without direct structural connection to a fuselage.

3. An apparatus according to claim 1 wherein the at least one airfoil structure is mounted upon the at least one wing.

4. An apparatus according to claim 1 wherein the at least one airfoil structure is mounted upon the at least one wing and spaced above the at least one wing tip.

5. An apparatus according to claim 1 wherein the at least one airfoil structure is mounted upon the at least one wing using a plurality of upwardly extending airfoil supports extending from said at least one wing to said at least one airfoil structure.

6. An apparatus according to claim 1 wherein the at least one airfoil structure has at least one unadjustable portion configured with respect to said at least one airfoil structure.

7. An apparatus according to claim 1 wherein the at least one airfoil structure pivots upon a generally spanwise axis.

8. An apparatus according to claim 1 wherein the aircraft may be controlled by means of adjustable positioning of at least part of the at least one airfoil structure; said at least one airfoil structure thereby providing at least partial control of said aircraft when said aircraft is appropriately moving forward.

9. An apparatus according to claim 1 wherein the center of mass is behind the center of lift when the aircraft is inappropriately loaded.

10. An apparatus according to claim 1 wherein the center of mass is behind the center of lift when the aircraft is empty.

11. The apparatus of claim 1, wherein said at least one downforce airfoil structure extends substantially perpendicular to said central plane when said apparatus is viewed from the front portion.

12. An apparatus forming an aircraft which is designed for flight by movement through the air, said aircraft having front and rear portions and a center of mass, said aircraft having left and right sides when divided by a central plane of reference, said aircraft having thereby inboard portions closer to said central plane of reference and outboard portions farther from said central plane of reference, said aircraft configured with respect to a downward direction and an upward direction, comprising:

at least one aerodynamic lifting surface configured to affect the flow of air near said at least one aerodynamic lifting surface when said aircraft is appropriately moving forward, said at least one aerodynamic lifting surface thereby configured to create positive upward lift when said aircraft is appropriately moving forward, said at least one aerodynamic lifting surface having a center of lift which is rearward of said center of mass of said aircraft in flight;

at least one downforce airfoil structure comprising a means for creating downward aerodynamic force when said aircraft is appropriately moving forward, said at least one downforce airfoil structure positioned predominantly rearward of said at least one aerodynamic lifting surface and entirely above said at least one aerodynamic lifting surface, said at least at least one downforce airfoil structure having a direction of said downward aerodynamic force generally opposite to the direction of said positive lift of said at least one aerodynamic lifting surface, said at least one downforce airfoil structure configured to create a magnitude of said downward aerodynamic force sufficient to thus provide the aircraft with positive pitch stability when the aircraft is is in trimmed level flight, wherein said means for creating positive pitch stability when the aircraft is in trimmed level flight is said at least one downforce airfoil structure having an inverted angle of attack when compared to the at least one aerodynamic lifting surface in trimmed level flight, said at least one downforce airfoil structure spaced from said flow near said at least one aerodynamic lifting surface, said at least one downforce airfoil structure occurring on both said left and right sides of said central plane of reference, said at least one downforce airfoil structure having at least one center of said downward aerodynamic force in which said at least one center is rearward of said center of lift, said at least one downforce airfoil structure is of sturdy construction appropriate with regard to said aerodynamic force; wherein said at least one downforce airfoil structure is constructed so as to have outboard portions thereof positioned outward of said central plane of reference to a distance at least four-fifths of the distance from said central plane of reference to a tip end of said at least one aerodynamic lifting surface and wherein the aircraft center of mass is forward of said center of positive aerodynamic lift.

13. The apparatus of claim 12, wherein said at least one downforce airfoil structure extends substantially perpendicular to said central plane when said apparatus is viewed from the front portion.

14. The apparatus of claim 1, wherein the means for creating downward aerodynamic force by said at least one airfoil structure further comprises the provision of negative camber relative to said at least one wing.

15. The apparatus of claim 14, wherein said at least one airfoil structure further comprises a fixed portion and a moving portion, wherein said moving portion can be moved relative to the fixed portion to vary the said at least one airfoil structure's camber and angle of attack.

16. The apparatus of claim 12, wherein the means for creating downward aerodynamic force by said at least one downforce airfoil structure further comprises the provision of negative camber relative to said at least one wing.

17. The apparatus of claim 16, wherein said at least one downforce airfoil structure further comprises a fixed portion and a moving portion, wherein said moving portion can be moved relative to the fixed portion to vary the said at least one downforce airfoil structure's camber and angle of attack.

\* \* \* \* \*